United States Patent
Desanti et al.

(10) Patent No.: US 11,520,937 B2
(45) Date of Patent: Dec. 6, 2022

(54) NVME OVER FABRICS AUTHENTICATION SYSTEM

(71) Applicant: Dell Products L.P., Round Rock, TX (US)

(72) Inventors: Claudio Desanti, Santa Cruz, CA (US); David Lionel Black, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 17/158,912

(22) Filed: Jan. 26, 2021

(65) Prior Publication Data

US 2022/0050933 A1    Feb. 17, 2022

Related U.S. Application Data

(60) Provisional application No. 63/064,509, filed on Aug. 12, 2020.

(51) Int. Cl.
*G06F 21/79* (2013.01)
*G06F 21/85* (2013.01)
(Continued)

(52) U.S. Cl.
CPC .............. *G06F 21/79* (2013.01); *G06F 21/31* (2013.01); *G06F 21/6209* (2013.01); *G06F 21/85* (2013.01); *G06F 2221/2103* (2013.01)

(58) Field of Classification Search
CPC ...... G06F 21/79; G06F 21/31; G06F 21/6209; G06F 21/85; G06F 2221/2103
(Continued)

(56) References Cited

U.S. PATENT DOCUMENTS

| | | | |
|---|---|---|---|
| 2007/0086724 A1* | 4/2007 | Grady | H04N 5/765 386/230 |
| 2010/0127822 A1* | 5/2010 | Devadas | H04L 9/3278 726/2 |

(Continued)

FOREIGN PATENT DOCUMENTS

| | | | | |
|---|---|---|---|---|
| CN | 101409620 A | * | 4/2009 | ........... H04L 63/083 |
| CN | 103597496 A | * | 2/2014 | ............ G06F 21/00 |

(Continued)

OTHER PUBLICATIONS

Kumar et al., "PHAP: Password based Hardware Authentication using PUFs," 2012 45th Annual IEEE/ACM International Symposium on Microarchitecture Workshops, 2012, pp. 24-31, doi: 10.1109/MICROW.2012.14. (Year: 2012).*

(Continued)

*Primary Examiner* — Peter C Shaw
(74) *Attorney, Agent, or Firm* — Joseph Mencher

(57) ABSTRACT

An NVMe-oF authentication system includes an authentication verification entity coupled to an NVMe subsystem that is coupled to an NVMe host device. The NVMe subsystem transmits a first challenge to the NVMe host device and, in response, receives a first challenge reply from the NVME host device. The NVMe subsystem then generates a first authentication verification request communication that includes a first response that was provided in the first challenge reply by the NVMe host device using a first instance of a first secret that is stored in the NVMe host device, and transmits the first authentication verification request communication to the authentication verification entity. The authentication verification entity receives the first authentication verification request communication, verifies the first response using a second instance of the first secret that is stored in the authentication verification entity and, in (Continued)

response, transmits a first authentication verification response communication to the NVMe subsystem.

20 Claims, 10 Drawing Sheets

(51) Int. Cl.
  *G06F 21/62* (2013.01)
  *G06F 21/31* (2013.01)
(58) Field of Classification Search
  USPC .......................................................... 726/26
  See application file for complete search history.

(56) References Cited

U.S. PATENT DOCUMENTS

| | | | | |
|---|---|---|---|---|
| 2011/0082966 | A1* | 4/2011 | Yu ...................... | G06F 12/1433 |
| | | | | 713/193 |
| 2019/0042480 | A1* | 2/2019 | Khatib Zadeh ........ | G11C 29/44 |
| 2019/0305969 | A1* | 10/2019 | Iijima ................... | H04L 9/0894 |
| 2020/0403813 | A1* | 12/2020 | Suresh ..................... | G11C 7/24 |
| 2022/0092167 | A1* | 3/2022 | Bishop .................... | G06F 21/45 |

FOREIGN PATENT DOCUMENTS

| | | | | |
|---|---|---|---|---|
| CN | 103946806 | A * | 7/2014 | .......... G06F 11/1415 |
| EP | 2911335 | A1 * | 8/2015 | ............... G09C 1/00 |
| GB | 2588647 | A * | 5/2021 | ............. G06F 21/44 |
| WO | WO-2014201059 | A1 * | 12/2014 | ............. G06F 21/31 |
| WO | WO-2018183926 | A1 * | 10/2018 | |
| WO | WO-2020078591 | A1 * | 4/2020 | ........... G06F 21/602 |

OTHER PUBLICATIONS

Desuert et al., "PUF-Based Protocol for Securing Constrained Devices," 2021 17th International Conference on Intelligent Environments (IE), 2021, pp. 1-8, doi: 10.1109/IE51775.2021.9486492. (Year: 2021).*

Nguyen et al., "Exploring Challenge-Response Mechanism Designs for IoT Initial Trust Establishment," 2018 IEEE International Conference on Communications Workshops (ICC Workshops), 2018, pp. 1-6, doi: 10.1109/ICCW.2018.8403774. (Year: 2018).*

IEEE, "IEEE Standard for Discovery, Authentication, and Authorization in Host Attachments of Storage Devices," in IEEE Std 1667-2018 (Revision of IEEE Std 1667-2015), vol. No., pp. 1-226, Oct. 2, 2018, doi: 10.1109/IEEESTD.2018.8479380. (Year: 2018).*

Kursawe et al., "Reconfigurable Physical Unclonable Functions—Enabling technology for tamper-resistant storage," 2009 IEEE International Workshop on Hardware-Oriented Security and Trust, 2009, pp. 22-29, doi: 10.1109/HST.2009.5225058. (Year: 2009).*

* cited by examiner

NVME OVER FABRICS AUTHENTICATION SYSTEM

CROSS-REFERENCE TO RELATED APPLICATIONS

The present disclosure claims priority to U.S. Provisional Patent Application No. 63/064,509, filed on Aug. 12, 2020, the disclosure of which is incorporated by reference herein in its entirety.

BACKGROUND

The present disclosure relates generally to information handling systems, and more particularly to authentication between information handling systems in a Non-Volatile Memory express (NVMe) over Fabrics (NVMe-oF) system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other host device known in the art, may utilize a Non-Volatile Memory express (NVMe) over Fabrics (NVMe-oF) protocol that provides for the connection of (and communication between) host devices and NVMe storage devices across a network. However, the security of such communications raises some issues. For example, Challenge/Response authentication protocols are a candidate to ensure the security of such host device/NVMe storage device communications, and one of skill in the art in possession of the present disclosure will recognize that Challenge/Response authentication protocols typically include 1) an authenticator device sending a challenge to a responder device, 2) the responder device providing challenge response to the authenticator device that was computed by applying a secure/one-way hash function on the challenge, a responder secret stored in the responder device, and other challenge/response information known in the art, and 3) the authenticator device verifying that challenge response by performing the same computation (i.e., applying a secure/one-way hash function on that challenge, the responder secret stored in the authenticator device, and the other challenge/response information). As such, the implementation of Challenge/Response authentication protocols to ensure the security of the host device/NVMe storage device communications discussed above will require that any authenticator device know the responder secrets of all of the responder devices it might communicate with, raising security issues (e.g., a compromise of an authenticator device may provide access to all the responder secrets stored on that authenticator device), management issues that limit scalability (e.g., each authenticator device must be configured with many responder secrets in a secure manner), and other issues that would be apparent to one of skill in the art.

Accordingly, it would be desirable to provide an NVMe-oF authentication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an authentication verification engine that is configured to: receive, from an Non-Volatile Memory express (NVMe) subsystem, a first authentication verification request communication that includes a first response that was provided to the NVMe subsystem in a first challenge reply by an NVMe host device using a first secret that is stored in the NVMe host device; verify the first response using the first secret that is stored in the authentication verification entity; and transmit, in response to verifying the first response, a first authentication verification response communication to the NVMe subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, Read-Only Memory (ROM), and/or other types of nonvolatile memory. Additional components of the information handling system may include one or more disk drives, one or more solid state drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
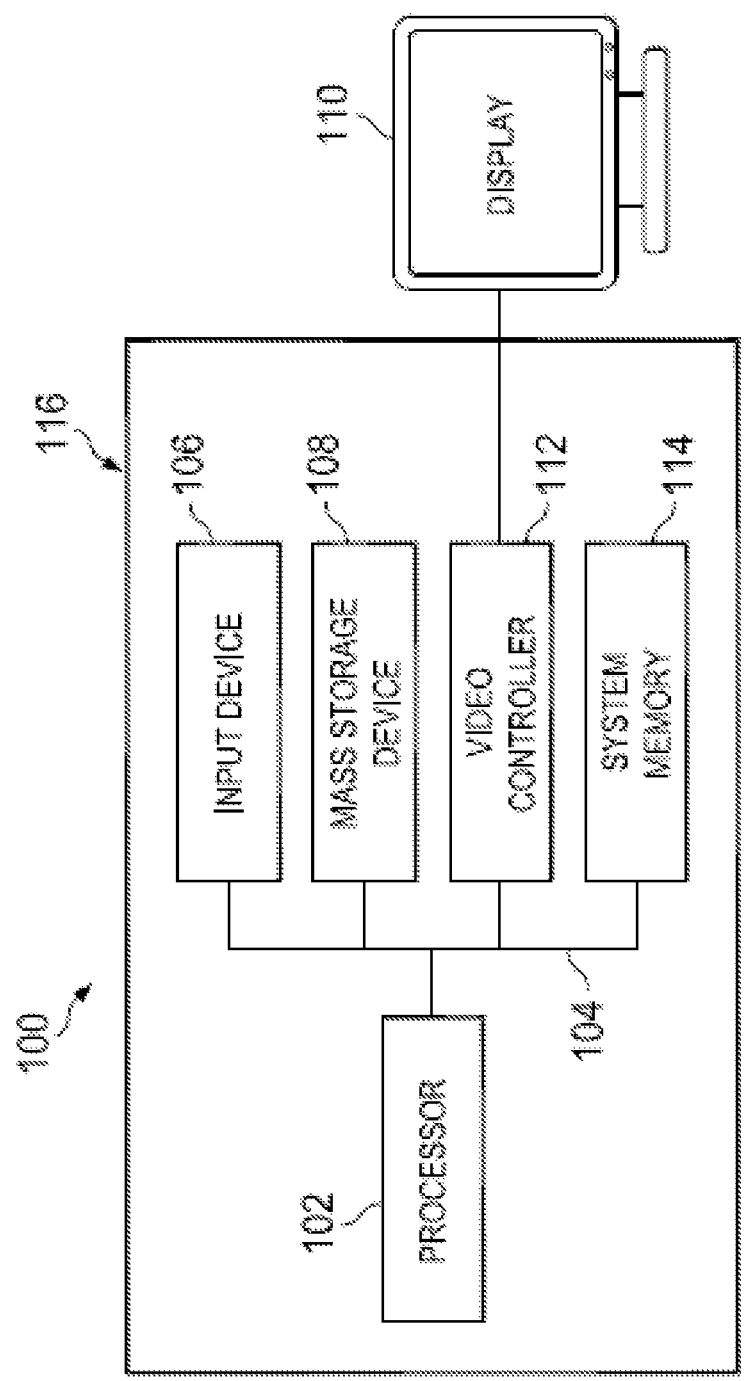
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 may be coupled to processor 102 to provide input to processor 102. Examples of input devices may include keyboards, touchscreens, pointing devices such as mouses/mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 may further be coupled to a display 110, which would then be coupled to processor 102 by a video controller 112 (although a display 110 is not necessary). A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102. For example, one of skill in the art in possession of the present disclosure will recognize that components may be remotely located from each other and connected over a network (e.g., display and related input devices discussed above will often be remote in a data center), and may be shared among IHS's (e.g., Keyboard/Video/Mouse subsystems may be remotely utilized with different IHSs in a data center).

Figure 2:
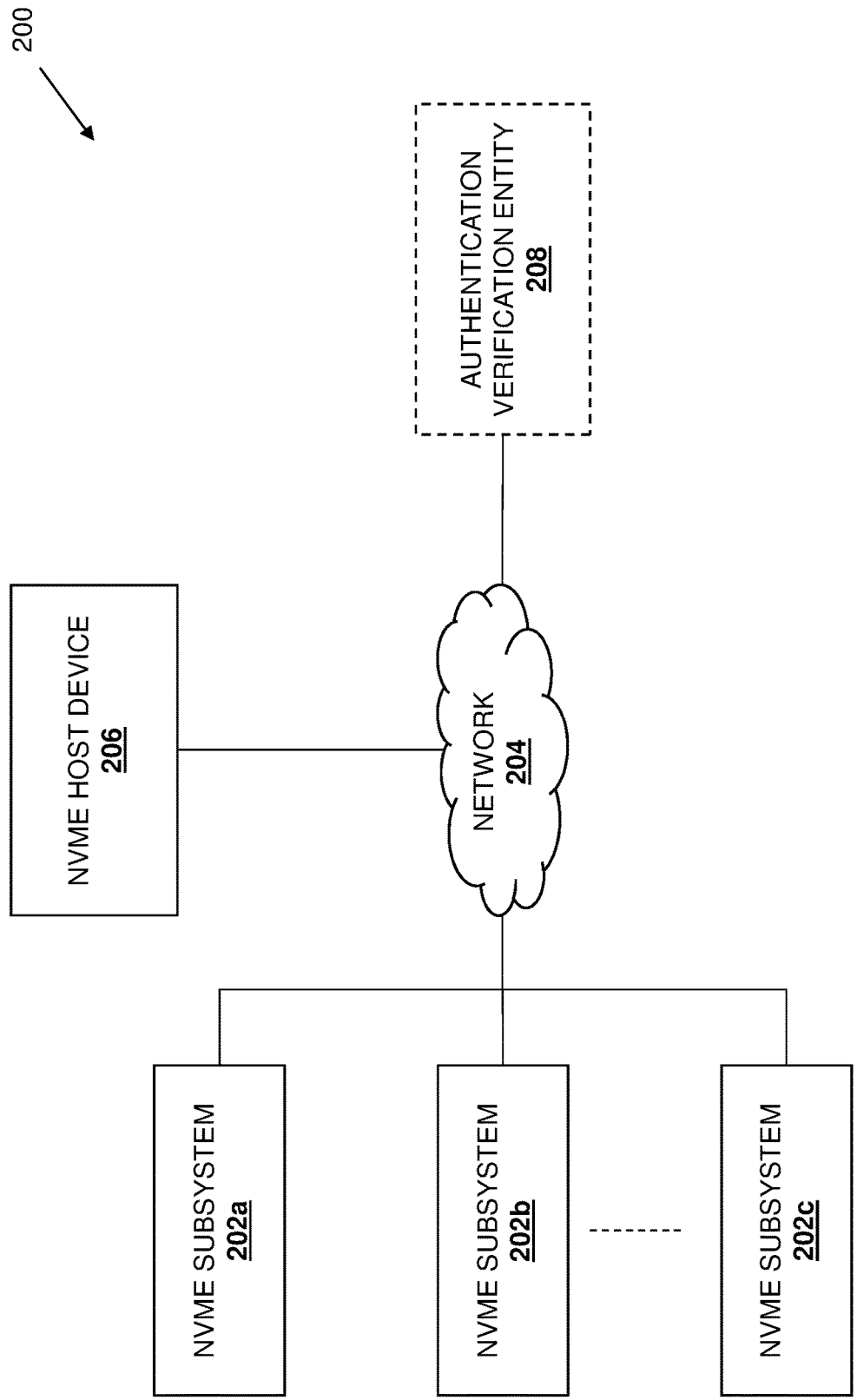
FIG. 2 is a schematic view illustrating an embodiment of a networked system that may include the NVMe over Fabrics authentication system of the present disclosure.

Referring now to FIG. 2, an embodiment of a networked system 200 is illustrated. In the illustrated embodiment, the networked system 200 includes a plurality of NVMe subsystems 202a, 202b, and up to 202c. In an embodiment, the NVMe subsystems 202a-202c may be provided by the IHS 100 discussed above with reference to FIG. 1, and/or may include some or all of the components of the IHS 100, and in specific examples may be provided by NVMe storage devices in a networked storage system utilizing the NVMe protocol. However, while illustrated and discussed as being included in a networked storage system utilizing a particular communication protocol, one of skill in the art in possession of the present disclosure will recognize that NVMe subsystems provided in the networked system 200 may include other types of NVMe devices that may be configured to operate similarly as the NVMe subsystems 202a-202c discussed below. In the specific examples discuss below, the NVMe-oF authentication operations are described as being performed with the NVMe subsystem 202a, but one of skill in the art in possession of the present disclosure will recognize that the NVMe-oF authentication operations discussed below may be performed in a similar manner with any of the NVMe subsystems 202b and up to 202c while remaining within the scope of the present disclosure as well.

In the illustrated embodiment, each of the NVMe subsystems 202a-202c are coupled to the network 204, which may be provided by a Local Area Network (LAN), the Internet, combinations thereof, and/or other networks (e.g., Fibre Channel networks, degenerate networks such as direct connections between hosts/subsystems, physically or logically distinct networks for host subsystem Input/Output (I/O) vs. Authentication Verification Entity access, physically or logically distinct networks between a host and different subsystems, etc.) that would be apparent to one of skill in the art in possession of the present disclosure. An NVMe host device 206 is also coupled to the network 204. In an embodiment, the NVMe host device 206 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that NVMe host devices provided in the networked system 200 may include other types of computing devices that may be configured to operate similarly as the NVMe host device 206 discussed below.

An authentication verification entity 208 is also coupled to the network 204. In an embodiment, the authentication verification entity 208 may be provided by the IHS 100 discussed above with reference to FIG. 1, and/or may include some or all of the components of the IHS 100, and in different examples may be provided in one or more server devices, in one or more of the NVMe subsystems 202a-202c, in the NVMe host device 206, in a networking device (e.g., a switch device) that provides the network 204, and/or in any other computing, networking, storage, or other devices provided as part of the networked system 200. As such, the dashed lines used to illustrate the authentication verification entity 208 (which is discussed in the examples below as having a separate connection to the network 204) are intended to convey that the functionality of the authentication verification entity 208 may be provided in any of a variety of device/locations throughout the networked system 200. However, while a specific networked system 200 has been illustrated and described, one of skill in the art in possession of the present disclosure will recognize that the networked system incorporating the NVMe-oF authentication system of the present disclosure may include a variety of components and component configurations while remaining within the scope of the present disclosure as well.

Figure 3:
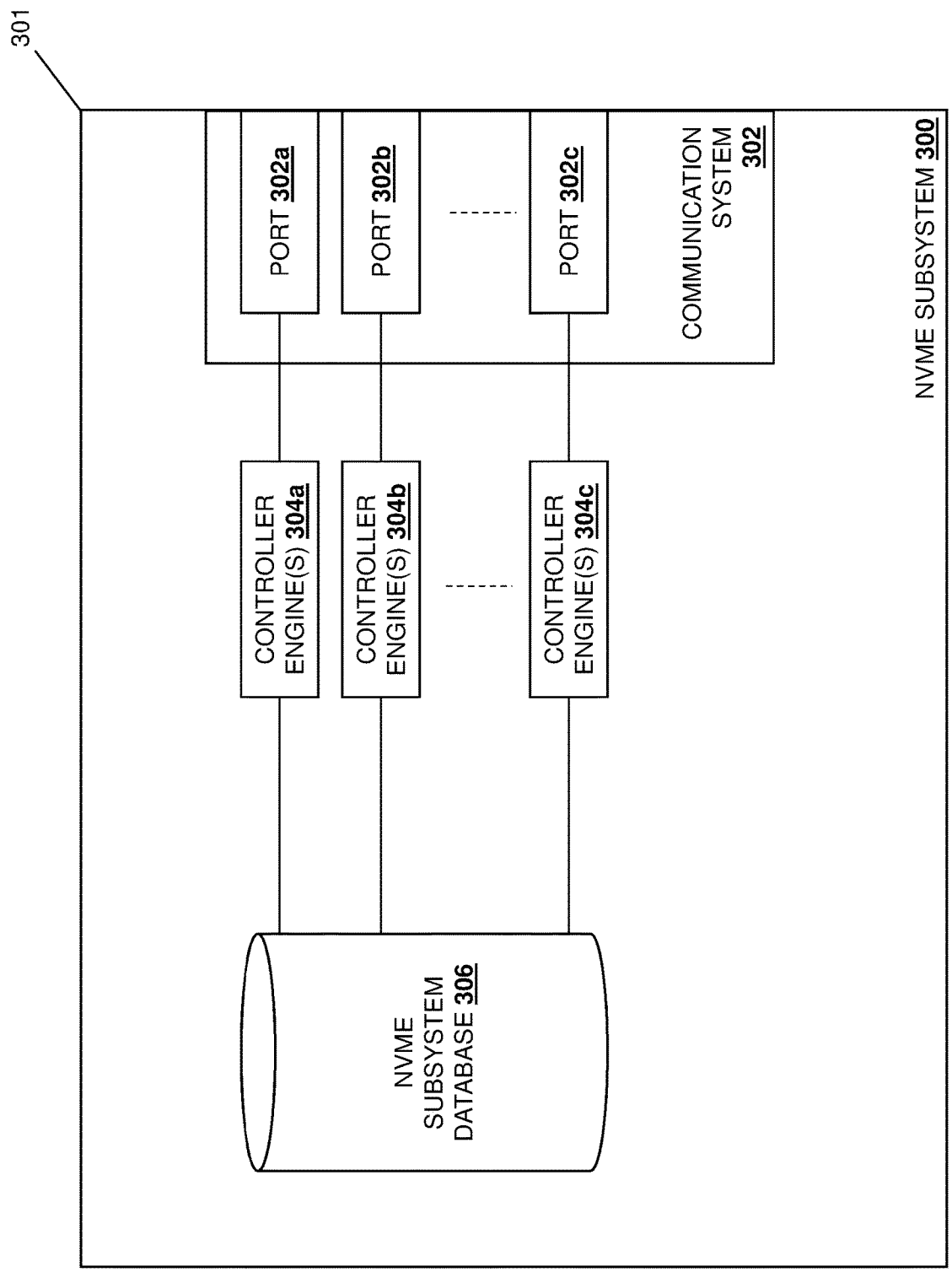
FIG. 3 is a schematic view illustrating an embodiment of an NVMe subsystem that may be included in the networked system of FIG. 2.

Referring now to FIG. 3, an embodiment of an NVMe subsystem 300 is illustrated that may provide any or all of the NVMe subsystems 202a-202c discussed above with reference to FIG. 2. As such, the NVMe subsystem 300 may be provided by the IHS 100 discussed above with reference to FIG. 1 and/or may include some or all of the components of the IHS 100, and in specific examples may be included in an NVMe storage device provided in a networked storage system. Furthermore, while illustrated and discussed as being included in a networked storage system including a plurality of NVMe storage devices, one of skill in the art in possession of the present disclosure will recognize that other types of NVMe devices may be configured to operate similarly as the NVMe subsystem 300 discussed below. In the illustrated embodiment, the NVMe subsystem 300 includes a chassis 301 that houses the components of the NVMe subsystem 300, only some of which are illustrated below.

In the illustrated example, the chassis 301 houses a communication system 302 that may be provided by a Network Interface Controller (NIC), wireless communication systems (e.g., cellular technologies such as 5G, etc.), and/or any other communication components that would be apparent to one of skill in the art in possession of the present disclosure. In the illustrated embodiment, the communication system 302 includes a plurality of ports 302a, 302b, and up to 302c, any of which may couple that NVMe subsystem 300 to the network 204 and/or other devices.

As illustrated in FIG. 3, the NVMe subsystem 300 may include a processing subsystem (not illustrated, but which may include the processor 102 discussed above with reference to FIG. 1) and a memory subsystem (not illustrated, but which may include the memory 114 discussed above with reference to FIG. 1) that is coupled to the processing subsystem and that includes instructions that, when executed by the processing subsystem, cause the processing subsystem to provide a plurality of controller engines that are configured to perform the functionality of the controller engines and/or NVMe subsystems discussed below. In the illustrated embodiment, one or more controller engines 304a are coupled to the port 302a, one or more controller engines 304b are coupled to the port 302b, and one or more controller engines 304c are coupled to the port 302c. As will be understood by one of skill in the art in possession of the present disclosure, a controller engine may be launched/generated (if not currently available) or assigned (if currently available) in the NVMe subsystem 300 to an NVMe host device in response to that NVMe host device connecting to its port, and thus the controller engines 304a-304c may be temporary entities that are generated by the processing system/memory system in the NVMe subsystem 300 in response to NVMe host devices connecting to corresponding ports 302a-302c.

Furthermore, the NVMe subsystem 300 may also include a storage subsystem (not illustrated, but which may include the storage 108 and/or memory 114 discussed above with reference to FIG. 1) that may be coupled to the controller engines 304a-304c (e.g., via a coupling between the storage subsystem and the processing subsystem when that processing system provides those controller engines 304a-304c) and that includes an NVMe subsystem database 306 that is configured to store any of the information accessed by the controller engines 304a-304c discussed below. As will be appreciated by one of skill in the art in possession of the present disclosure, the NVMe subsystem database 306 may be provided by any device that is configured to store data for use as discussed below, and the information stored in the NVMe subsystem database 306 may provide a single record of how to deal with any NVMe host device connected to one of the ports 302a-302c, regardless of which of those port it is connected to.

However, while a specific NVMe subsystem 300 has been illustrated and described, one of skill in the art in possession of the present disclosure will recognize that NVMe subsystems (or other devices operating according to the teachings of the present disclosure in a manner similar to that described below for the NVMe subsystem 300) may include a variety of components and/or component configurations for providing conventional NVMe subsystem functionality, as well as the functionality discussed below, while remaining within the scope of the present disclosure as well.

Figure 4:
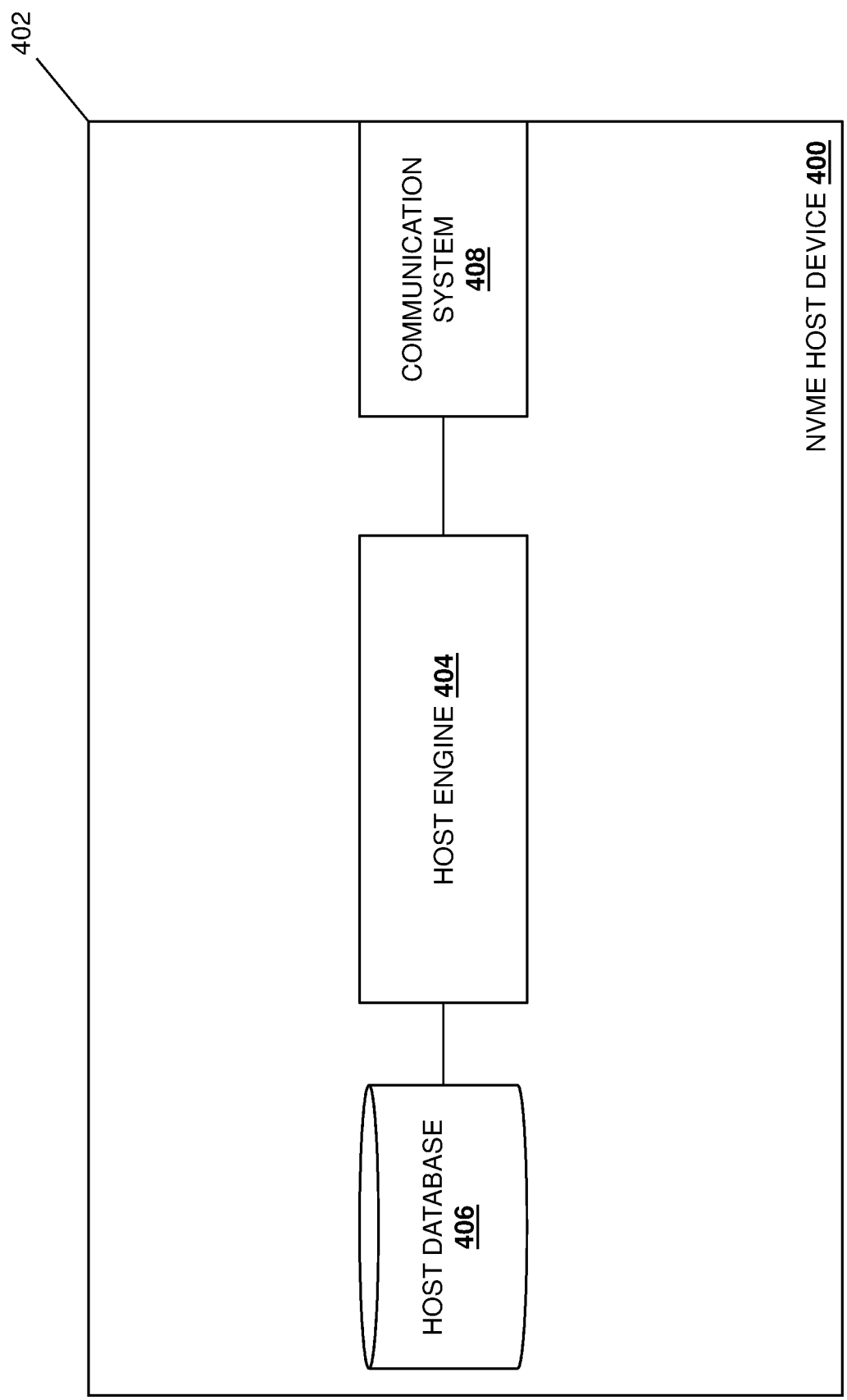
FIG. 4 is a schematic view illustrating an embodiment of an NVMe host device that may be included in the networked system of FIG. 2.

Referring now to FIG. 4, an embodiment of an NVMe host device 400 is illustrated that may provide the NVMe host device 206 discussed above with reference to FIG. 2. As such, the NVMe host device 400 may be provided by the IHS 100 discussed above with reference to FIG. 1 and/or may include some or all of the components of the IHS 100, and in the specific examples below is described as being provided by a server device. However, while illustrated and discussed as being provided by a server device, one of skill in the art in possession of the present disclosure will recognize that the functionality of the NVMe host device 400 discussed below may be provided by other NVMe host devices that are configured to operate similarly as the NVMe host device 400 discussed below. In the illustrated embodiment, the NVMe host device 400 includes a chassis 402 that houses the components of the NVMe host device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host engine 404 that is configured to perform the functionality of the host engines and/or NVMe host devices discussed below.

The chassis 402 may also house a storage system (not illustrated, but which may include the storage 108 discussed above with reference to FIG. 1) that is coupled to the host engine 404 (e.g., via a coupling between the storage system and the processing system) and that includes a host database 406 that is configured to store any of the information utilized by the host engine 404 discussed below. The chassis 402 may also house a communication system 408 that is coupled to the host engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, 5G cellular components, etc.), and/or any other communication components that would be apparent to one of skill in the art in possession of the present disclosure. However, while a specific NVMe host device 400 has been illustrated and described, one of skill in the art in possession of the present disclosure will recognize that host devices (or other devices operating according to the teachings of the present disclosure in a manner similar to that described below for the NVMe host device 400) may include a variety of components and/or component configurations for providing conventional host device functionality, as well as the functionality discussed below, while remaining within the scope of the present disclosure as well.

Figure 5:
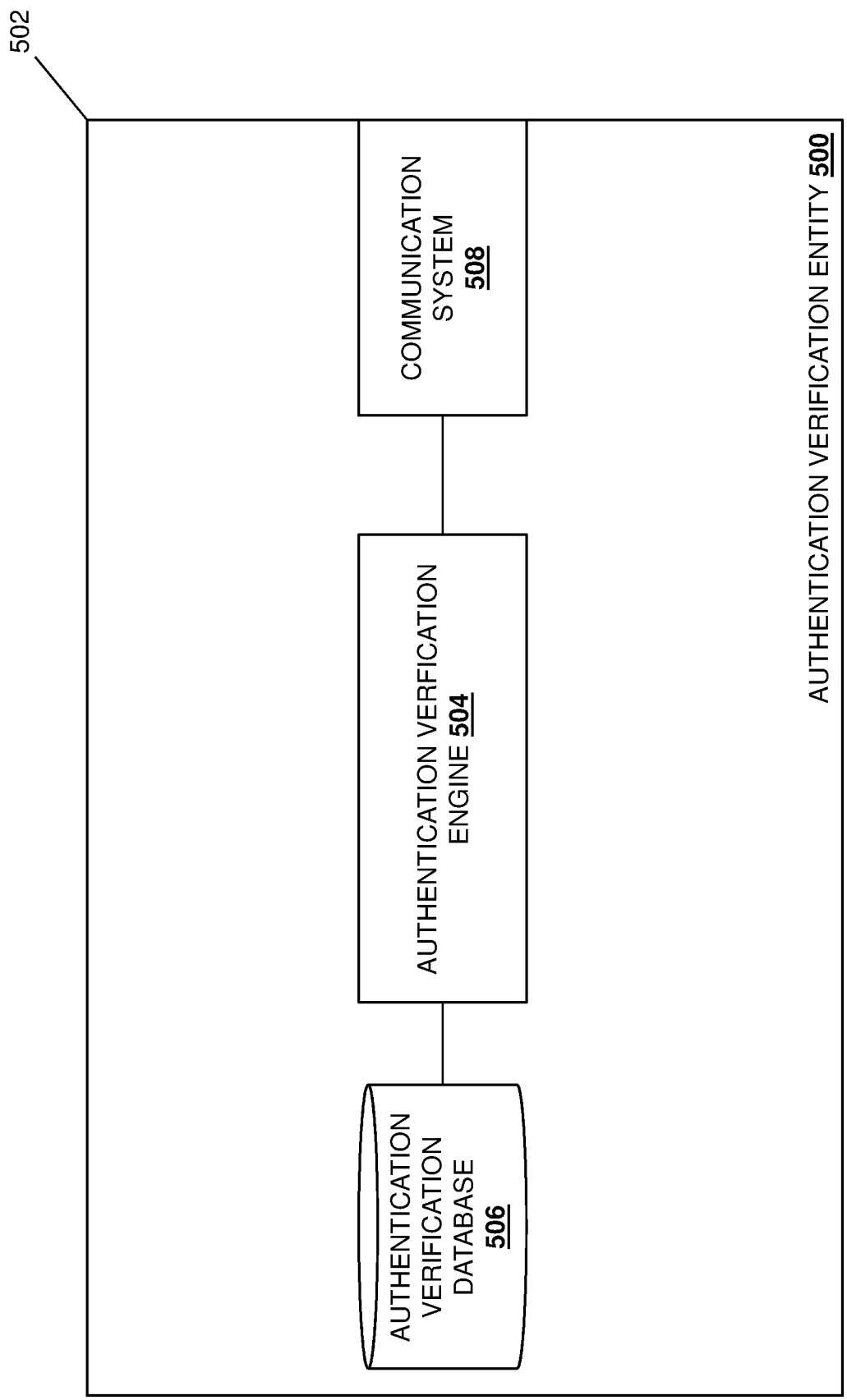
FIG. 5 is a schematic view illustrating an embodiment of an authentication verification entity that may be included in the networked system of FIG. 2.

Referring now to FIG. 5, an embodiment of an authentication verification entity 500 is illustrated that may provide the authentication verification entity 208 discussed above with reference to FIG. 2. As such, the authentication verification entity 500 may be provided by the IHS 100 discussed above with reference to FIG. 1 and/or may include some or all of the components of the IHS 100, and in the specific examples below is described as being provided by a dedicated server device. However, as discussed above, in other embodiments the authentication verification entity 500 may be provided by and/or included in one or more of the NVMe subsystems 202a-202c/300, may be provided by and/or included in the NVMe host device 206/400, and/or provided by and/or included in one or more networking devices (e.g., switch devices) that provide the network 204. Furthermore, while illustrated and discussed as being provided by a variety of different devices/locations in the networked system 200, one of skill in the art in possession of the present disclosure will recognize that the functionality of the authentication verification entity 500 discussed below may be provided by other devices in the networked system 200 that are configured to operate similarly as the authentication verification entity 500 discussed below.

In the illustrated embodiment, the authentication verification entity 500 includes a chassis 502 that houses the components of the authentication verification entity 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an authentication verification engine 504 that is configured to perform the functionality of the authentication verification engines and/or authentication verification entities discussed below. As such, rather than the chassis 502 being a dedicated chassis, one of skill in the art in possession of the present disclosure will appreciate that the authentication verification engine 504 may be included in the chassis 301 of the NVMe subsystem 300, in the chassis 402 of the NVMe host device 400, and/or in the chassis of other devices in the networked system 200. In a specific example, the authentication verification engine 504 may be included in a container or Virtual Machine that is configured on the hardware device in which it is provided, but one of skill in the art in possession of the present disclosure will appreciate that the functionality of the authentication verification entity may be provided in a variety of manners that will fall within the scope of the present disclosure as well.

The chassis 502 may also house a storage system (not illustrated, but which may include the storage 108 discussed above with reference to FIG. 1) that is coupled to the authentication verification engine 504 (e.g., via a coupling between the storage system and the processing system) and that includes an authentication verification database 506 that is configured to store any of the information utilized by the authentication verification engine 504 discussed below. The chassis 502 may also house a communication system 508 that is coupled to the authentication verification engine 504 (e.g., via a coupling between the communication system 508 and the processing system) and that may be provided by a Network Interface Controller (NIC), wireless communication systems (e.g., BLUETOOTH®, Near Field Communication (NFC) components, WiFi components, 5G wireless components, etc.), and/or any other communication components that would be apparent to one of skill in the art in possession of the present disclosure. However, while a specific authentication verification entity 500 has been illustrated and described, one of skill in the art in possession of the present disclosure will recognize that authentication verification entities may include a variety of components and/or component configurations for providing conventional authentication verification functionality, as well as the functionality discussed below, while remaining within the scope of the present disclosure as well.

Figure 6:
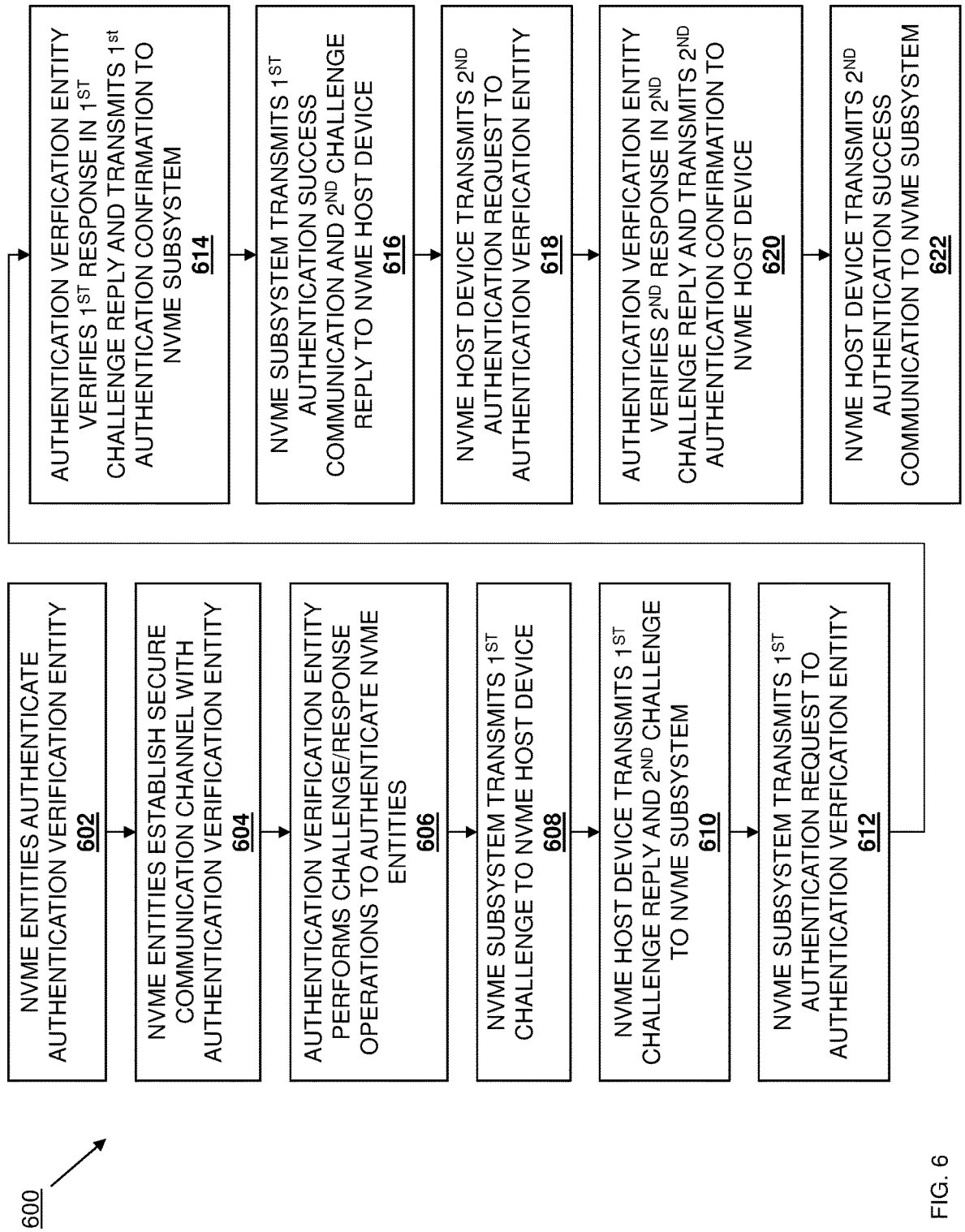
FIG. 6 is a flow chart illustrating an embodiment of a method for performing NVMe-oF authentication.

Referring now to FIG. 6, an embodiment of a method 600 for performing NVMe-oF authentication is illustrated. As discussed below, the systems and methods of the present disclosure provide a centralized authentication verification entity that operates to offload authentication verification operations from NVMe entities in the NVMe-oF system, which allows the NVMe entities to be provisioned with only their associated secret utilized in authentication operations, thus providing a scalable NVMe-oF authentication system. For example, the NVMe-oF authentication system of the present disclosure may include an authentication verification entity coupled to an NVMe subsystem and an NVMe host device, with the NVMe subsystem coupled to the NVMe host device. The NVMe subsystem transmits a first challenge to the NVMe host device and, in response, receives a first challenge reply from the NVME host device. The NVMe subsystem then generates a first authentication verification request communication that includes a first response that was provided in the first challenge reply by the NVMe host device using a first instance of a first secret that is stored in the NVMe host device, and transmits the first authentication verification request communication to the authentication verification entity. The authentication verification entity receives the first authentication verification request communication, verifies the first response using a second instance of the first secret that is stored in the authentication verification entity and, in response, transmits a first authentication verification response communication to the NVMe subsystem. As discussed below, the operations described above may be performed via secure communication channels that are established between the authentication verification entity and each NVMe entity without relying on a single, common shared secret or public key certificates, thus providing scalable and manageable NVMe-oF authentication configuration operations for individual entity authentication that are linearly scalable (i.e., requiring only one secret be provided on each NVMe entity, with the authentication verification entity being the only location where all the NVMe entity secrets are stored).

The method 600 begins at block 602 where NVMe entities authenticate an authentication verification entity. As will be appreciated by one of skill in the art in possession of the present disclosure, the operations described below at blocks 602, 604 and 606 operate to establish secure communications channels between the authentication verification entity 208/500 and each of the NVMe entities in the networked system 200 (i.e., the NVMe subsystems 202a-202c/300 and NVMe host device 206/400 in the examples below), and the different NVMe entities discussed below (e.g., the NVMe subsystem 202a/300 and the NVMe host device 206) may perform the operations described below with regard to blocks 602, 604, and 606 concurrently while remaining within the scope of the present disclosure. Furthermore, one of skill in the art in possession of the present disclosure will recognize that the NVMe subsystem 202a/300 may perform blocks 602-606 before proceeding to block 608, while the NVMe host device 206 may perform blocks 602-606 before proceeding to block 610.

One of skill in the art in possession of the present disclosure will recognize that it is desirable (for security reasons) for the NVMe entity/authentication verification entity communications performed at blocks 612 and 618 discussed below to include integrity protections and confidentiality because, for example, they may include challenge/response pairs (e.g., for Hashed Media Access Control—Challenge Handshake Authentication Protocol (HMAC-CHAP) portions of Diffie-Hellman-HMAC-CHAP (DH-HMAC-CHAP) operations in the examples below). As will be appreciated by one of skill in the art in possession of the present disclosure, the establishment of secure communications channels for the NVMe entity/authentication verification entity communications is needed to that prevent an unauthorized user from tampering with the security critical information transmitted as part of these operations, or from learning and using that information in order to bypass the DH portion of the DH-HMAC-CHAP operations discussed below and enable an offline attack against the authentication secrets utilized as discussed below.

Furthermore, one of skill in the art in possession of the present disclosure will recognize how the specific examples of the operations described below at blocks 602, 604 and 606 operate to create "lightweight" secure communications channels between the authentication verification entity 208/500 and each of the NVMe entities in the networked system 200 in a manner that addresses issues associated with a single, common shared secret or public certificate. As will be appreciated by one of skill in the art in possession of the present disclosure, a single, common shared secret approach is associated with issues such as the possible compromise of a single NVMe entity that allows an unauthorized user to acquire its corresponding secret, access the authentication verification entity 208/500, and attempt to guess the NVMe secrets for other NVMe entities that are stored in the authentication verification entity 208/500.

As will be appreciated by one of skill in the art in possession of the present disclosure, blocks 602 to 606 are performed to allow an NVMe entity to authenticate and establish a lightweight secure channel with the authentication verification entity, which can be achieved in two ways: bidirectional authentication or mutual authentication. When the secure channel between the NVMe entity and the authentication verification entity is established through bidirectional authentication, each NVMe entity may be provided with the public key of the authentication verification entity, and that public key may be used to authenticate the authentication verification entity at block 602 and establish the secure channel at block 604, with the authentication verification entity authenticating the NVMe entity through a challenge/response operation at block 606. However, when the secure channel with the authentication verification entity is established through mutual authentication, each NVMe entity may be provided with a Pre-Shared Key (PSK) specific for that NVMe entity, with the PSK used to mutually authenticate the NVMe entity and the authentication verification entity at block 602 and to establish the secure channel at block 604. As such, block 606 may be omitted when the secure channel between the NVMe entity and the authentication verification entity is established through mutual authentication.

Figure 7A:
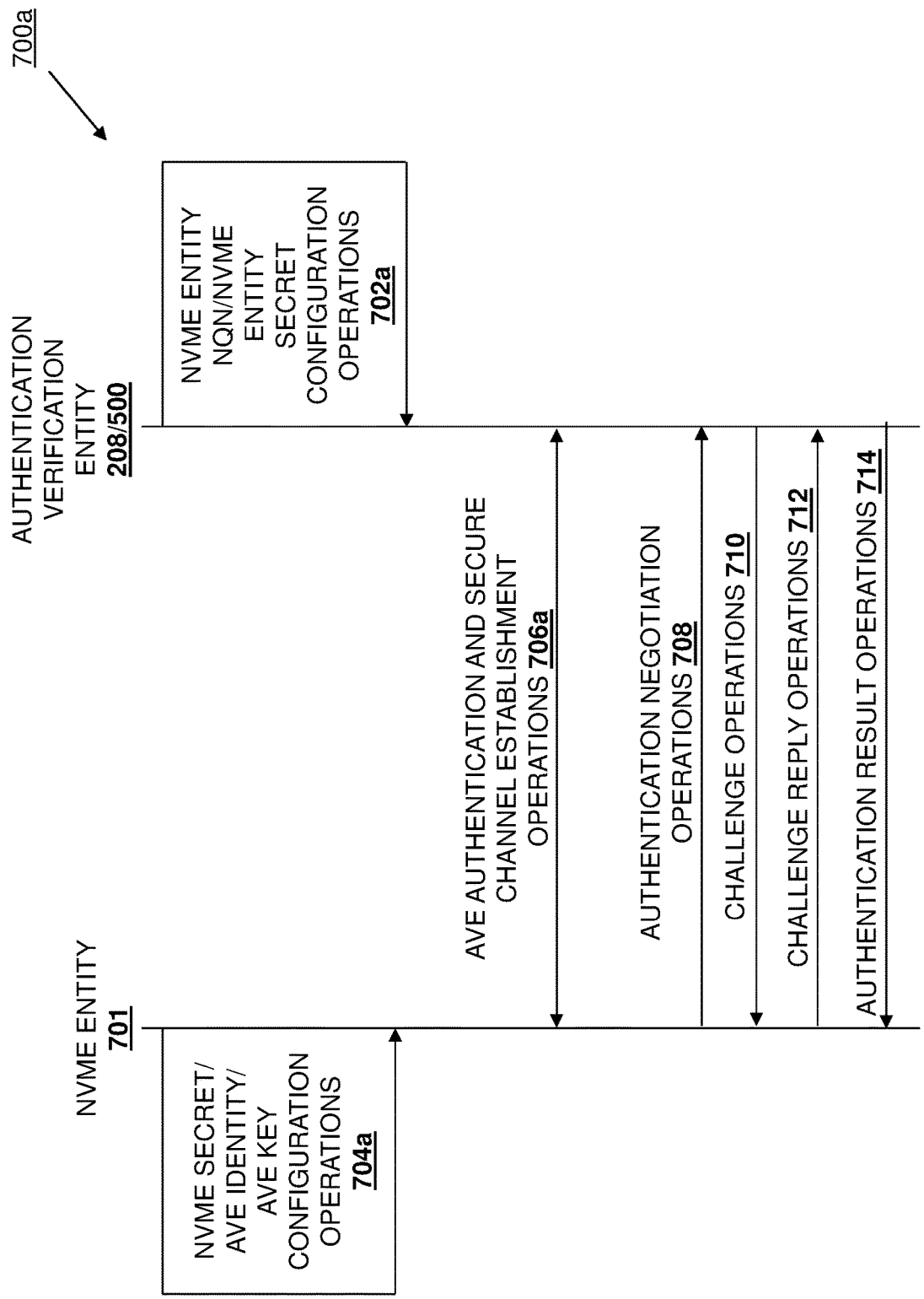
FIG. 7A is a ladder diagram illustrating an embodiment of the NVMe entity of FIG. 3 or 4 and the authentication verification entity of FIG. 5 operating during the method of FIG. 6.
Figure 7B:
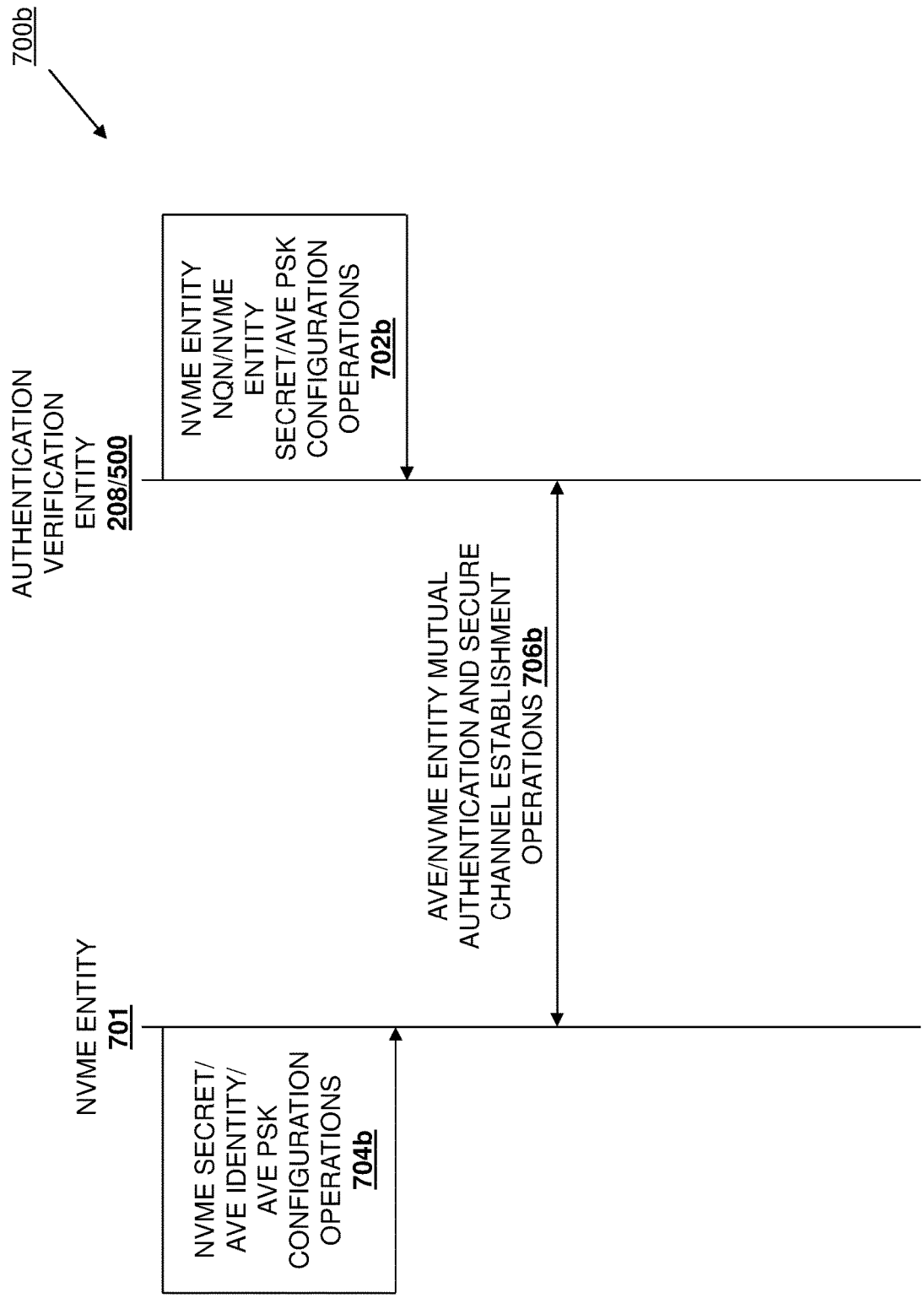
FIG. 7B is a ladder diagram illustrating an embodiment of the NVMe entity of FIG. 3 or 4 and the authentication verification entity of FIG. 5 operating during the method of FIG. 6.

With reference to FIGS. 7A and 7B, NVMe entity/Authentication Verification Entity (AVE) authentication operations 700a and 700b are illustrated in a ladder diagram that identifies operations performed by the AVE 208/500 and an NVMe entity 701 that may be provided by any of the NVMe subsystems 202a-202c, or the NVMe host device 206, in the examples provided herein.

As illustrated in FIG. 7A, prior to the method 600, NVMe subsystem NVMe Qualified Name (NQN)/NVMe subsystem secret configuration operations 702a may be performed on the authentication verification entity 208/500. In an embodiment, the NVMe subsystem NQN/NVMe subsystem secret configuration operations 702a may include a network administrator or other user providing an identification of the NVMe entity 701 in the authentication verification entity 208/500 using an NVMe subsystem NQN which may be stored in the authentication verification database 506 and which one of skill in the art in possession of the present disclosure will recognize is used in the NVMe-oF protocol to uniquely identify NVMe hosts and subsystems (e.g., the NVMe entity 701 in some of the examples below). Furthermore, the NVMe subsystem NQN/NVMe subsystem secret configuration operations 702a may also include the network administrator or other user providing a secret (e.g., a DH-HMAC-CHAP secret) associated with the NVMe entity 701 in the authentication verification entity 208/500, which may be stored in the authentication verification database 506 as well.

As also illustrated in FIG. 7A, during or prior to the method 600, NVMe secret/AVE identity/AVE key configuration operations 704a may be performed on the NVMe entity 701. In an embodiment, the NVMe secret/AVE identity/AVE key configuration operations 704a may include a network administrator or other user providing the secret (e.g., a DH-HMAC-CHAP secret) discussed above that is associated with the NVMe entity 701 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein. Furthermore, the NVMe secret/AVE identity/AVE key configuration operations 704a may include a network administrator or other user providing an identity of the authentication verification entity 208/500 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein. In a specific example, the identity of the authentication verification entity 208/500 may be provided by an NQN associated with the AVE 208/500, a Domain Name System (DNS) name associated with the authentication verification entity 208/500, and/or other authentication verification entity identifiers that would be apparent to one of skill in the art in possession of the present disclosure.

Further still, the NVMe secret/AVE identity/AVE key configuration operations 704a and 704b may also include a network administrator or other user providing a public key associated with the authentication verification entity 208/500 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein. As will be appreciated by one of skill in the art in possession of the present disclosure, the public key associated with the authentication verification entity 208/500 may be paired with a private key stored in the authentication verification entity 208/500, and allows signatures provided using that private key to be used to verify the authenticity of the authentication verification entity 208/500.

In a specific example, Secure Shell (SSH) techniques may be utilized to generate the public/private key pair discussed above (e.g., via "ssh-keygen" operations), store the private key in the authentication verification entity 208/500, and provide the public key to the NVMe entity 701. However, another option may include the utilization of user-generated self-signed certificates, which may include replacing the public key discussed above with a hash fingerprint of the self-signed-certificate associated with the authentication verification entity 208/500.

As also discussed below, the bi-directional authentications techniques discussed above (using public/private key techniques and DH-HMAC-CHAP techniques to perform authentication between the authentication verification entity and the NVMe entities) may be replaced by mutual authentication techniques that provide a shared secret (e.g., an authentication verification entity PSK) between each NVMe entity 701 and the authentication verification entity 208/500 (while still providing linear scalability) while remaining within the scope of the present disclosure as well. In this case the authentication verification database 506 may maintain the authentication verification entity PSK that is configured in conjunction with the NQN and secret for the NVMe entity, as shown in FIG. 7B.

As illustrated in FIG. 7B, prior to the method 600, NVMe subsystem NVMe Qualified Name (NQN)/NVMe subsystem secret/AVE PSK configuration operations 702b may be performed on the authentication verification entity 208/500. In an embodiment, the NVMe subsystem NQN/NVMe subsystem secret configuration operations 702b may include a network administrator or other user providing an identification of the NVMe entity 701 in the authentication verification entity 208/500 using an NVMe subsystem NQN which may be stored in the authentication verification database 506 and which one of skill in the art in possession of the present disclosure will recognize is used in the NVMe-oF protocol to uniquely identify NVMe hosts and subsystems (e.g., the NVMe entity 701 in some of the examples below). Furthermore, the NVMe subsystem NQN/NVMe subsystem secret configuration operations 702b may also include the network administrator or other user providing a secret (e.g., a DH-HMAC-CHAP secret) associated with the NVMe entity 701 in the authentication verification entity 208/500, which may be stored in the authentication verification database 506 as well. Furthermore, the NVMe subsystem NQN/NVMe subsystem secret configuration operations 702b may also include the network administrator or other user providing a PSK (e.g., an AVE PSK) associated with both the NVMe entity 701 and the authentication verification entity 208/500, which may be stored in the authentication verification database 506 as well.

As also illustrated in FIG. 7B, during or prior to the method 600, NVMe secret/AVE identity/AVE PSK configuration operations 704b may be performed on the NVMe entity 701. In an embodiment, the NVMe secret/AVE identity/AVE PSK configuration operations 704b may include a network administrator or other user providing the secret (e.g., a DH-HMAC-CHAP secret) discussed above that is associated with the NVMe entity 701 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein. Furthermore, the NVMe secret/AVE identity/AVE PSK configuration operations 704a may include a network administrator or other user providing an identity of the authentication verification entity 208/500 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein. In a specific example, the identity of the authentication verification entity 208/500 may be provided by an NQN associated with the AVE 208/500, a Domain Name System (DNS) name associated with the authentication verification entity 208/500, and/or other authentication verification entity identifiers that would be apparent to one of skill in the art in possession of the present disclosure.

Further still, the NVMe secret/AVE identity/AVE PSK configuration operations 704b may also include a network administrator or other user providing a PSK associated with both the authentication verification entity 208/500 and the NVMe entity 701 in the NVMe entity 701, which may be stored in the NVMe subsystem database 306 in the NVMe subsystem 300 that provides an NVMe entity in the examples below, in the host database 406 in the NVMe host device 206/400 that provides an NVMe entity in the examples below, and/or in a database included in any other NVMe entity that operates as part of the NVMe-oF authentication system described herein.

As illustrated in FIGS. 7A and 7B, the NVMe entity 701 and the authentication verification entity 208/500 may perform AVE authentication and secure channel establishment operations 706a and AVE/NVMe entity mutual authentication and secure channel establishment operations 706b. For example, in an embodiment of block 602, the AVE authentication and secure channel establishment operations 706a may include the NVMe entity 701 authenticating the authentication verification entity 208/500. Continuing with the specific example provided above, at block 602, the NVMe entity 701 may use the identifier for the authentication verification entity 208/500 and the public key associated with the authentication verification entity 208/500 to authenticate the authentication verification entity 208/500, and one of skill in the art in possession of the present disclosure will recognize how the public key associated with the authentication verification entity 208/500 may be utilized to check/verify a proof/demonstration provided by the authentication verification entity 208 of knowledge of the corresponding private key. However, as discussed above, rather than the NVMe entity 701 using a public key to authenticate the authentication verification entity 208/500 based on the authentication verification entity's proof/demonstration of knowledge of the corresponding private key, the NVMe entity 701 and authentication verification entity 208/500 may utilize a PSK to perform a mutual authentication while remaining within the scope of the present disclosure as well, as shown in the AVE/NVMe entity mutual authentication and secure channel establishment operations 706b of FIG. 7B.

As will be appreciated by one of skill in the art in possession of the present disclosure, the authentication operations performed at block 602 may be performed between the authentication verification engine 504 in the authentication verification entity 208/500 and 1) the controller engine 304a included in the NVMe subsystem 202a/300 that provides the NVMe entity 701 in the examples below, 2) the host engine 404 in the NVMe host device 206/400 that provides the NVMe entity 701 in the examples below, or 3) similar engines in any other NVMe entity that operates as part of the NVMe-oF authentication system described herein.

The method 600 then proceeds to block 604 where the NVMe entities establish secure communication channels with the authentication verification entity. In an embodiment, at block 604, the AVE authentication and secure channel establishment operations 706a and 706b may include the NVMe entity 701 establishing a communication channel with the authentication verification entity 208/500. As such, at block 604 and in response to authenticating the authentication verification entity 208/500, the NVMe entity 701 may establish a secure communications channel with the authentication verification entity 208/500. In a specific example, the secure communication channel with the authentication verification entity 208/500 may be provided by a datagram service (e.g., with no need to track a connection state), and the establishment of the secure communications channel between the NVMe entity 701 and the authentication verification entity 208/500 may include the use of the Datagram Transport Layer Security (DTLS) protocol to establish a DTLS secure communications channel. However, while a specific example is provided, one of skill in the art in possession of the present disclosure will appreciate that other protocols may be used at block 604 to establish secure communications channels while remaining within the scope of the present disclosure as well.

As will be appreciate by one of skill in the art in possession of the present disclosure, the secure communications channel establishment operations performed at block 604 may be performed between the authentication verification engine 504 in the authentication verification entity 208/500 and 1) the controller engine 304a in the NVMe subsystem 202a/300 that provides the NVMe entity 701 in the examples below, 2) the host engine 404 in the NVMe host device 206/400 that provides the NVMe entity 701 in the examples below, or 3) similar engines in any other NVMe entity that operates as part of the NVMe-oF authentication system described herein.

In embodiments in which bidirectional authentication is performed as discussed above, the method 600 then proceeds to block 606 where the authentication verification entity performs challenge/response operations to authenticate the NVMe entities. In an embodiment, at block 606 and subsequent to the establishment of the secure communications channel between the NVMe entity 701 and the authentication verification entity 208/500, the authentication verification engine 504 in the authentication verification entity 208/500 may perform the challenge/response operations discussed below with 1) the controller engine 304a in the NVMe subsystem 202a/300 that provides the NVMe entity 701 in the examples below, 2) the host engine 404 in the NVMe host device 206/400 that provides the NVMe entity 701 in the examples below, or 3) similar engines in any other NVMe entity that operates as part of the NVMe-oF authentication system described herein.

With reference to FIG. 7A, at block 606 the NVMe entity 701 may perform authentication negotiation operations 708 that include transmitting an authentication negotiation communication to the authentication verification entity 208/500. In a specific example, the authentication negotiation communication transmitted by the NVMe entity 701 may include the following information:

(T_ID, AuthID, TLS_c, HashIDList, DHgIDList)

As will be appreciated by one of skill in the art in possession of the present disclosure, the "T_ID" component of the authentication negotiation communication in the example above provides a transaction identifier that may be utilized to identify that authentication negotiation communication, the "AuthID" component of the authentication negotiation communication in the example above provides an authentication protocol identifier that may be utilized to identify an authentication protocol for use in the challenge/response operations, the "TLS_c" component of the authentication negotiation communication in the example above provides a secure channel creation identifier that is utilized to identify that a secure channel should not be established in response to successful challenge/response operations (because these operations are performed via the secure channel previously established at block 604), the "HashIDList" component of the authentication negotiation communication in the example above provides a list of secure hash functions that may be utilized in the challenge/response operations, and the "DHgIDList" component of the authentication negotiation communication in the example above provides a list of DH groups that may be utilized in the challenge/response operations to provide enhanced security. Furthermore, while a specific authentication negotiation communication (i.e., a DH-HMAC-CHAP authentication negotiation communication) is described, one of skill in the art in possession of the present disclosure will appreciate that authentication negotiation communications may include other information while remaining within the scope of the present disclosure as well.

With reference to FIG. 7A, at block 606 and in response to receiving the authentication negotiation communication as part of the authentication negotiation operations 708, the authentication verification entity 208/500 may perform challenge operations 710 that include transmitting a challenge communication to the NVMe entity 710. In a specific example, the authentication verification entity 208/500 may select parameters for the protocols (e.g., select a HashID from a HashIDList and a DHgID from a DHgIDList in the examples provided herein), and then generate and transmit a challenge communication, and one of skill in the art in possession of the present disclosure will appreciate that the negotiation may fail if the authentication verification entity 208/500 does not find any of the available/offered IDs acceptable. Thus, in some examples, the challenge communication transmitted by the authentication verification entity 208/500 may include the following information:

(T_ID, HashID, DHgID, $I_a$, $C_a$, $g^x$ mod p)

As will be appreciated by one of skill in the art in possession of the present disclosure, the "T_ID" component of the challenge communication in the example above provides a transaction identifier that may be utilized to identify that challenge communication, the "HashID" component of the challenge communication in the example above provides an identification of a hash function for use in the challenge/response operations, the "DHgID" component of the challenge communication in the example above provides an identification of a DH group for use in the challenge/response operations to provide enhanced security, the "$I_a$" component of the challenge communication in the example above provides a sequence number for use in the challenge/response operations to provide enhanced security, the "C" component of the challenge communication in the example above provides the challenge in the challenge/response operations, and the "$g^x$ mod p" component of the challenge communication in the example above provides a DH exponential parameter for use in the challenge/response operations to provide enhanced security where "g" and "p" are parameters of the DH group indicated by the "DHgID" component and "x" is generated by the authentication verification entity. However, while a specific challenge communication (i.e., a DH-HMAC-CHAP challenge communication) is described, one of skill in the art in possession of the present disclosure will appreciate that challenge communications may include other information while remaining within the scope of the present disclosure as well.

With reference to FIG. 7A, at block 606 and in response to receiving the challenge communication as part of the challenge operations 710, the NVMe entity 701 may perform challenge reply operations 712 that include transmitting a challenge reply communication to the authentication verification entity 208/500. In a specific example, the challenge reply communication transmitted by the NVMe entity 701 may include the following information:

($T\_ID$, $R_a$, $g^y$ mod p)

As will be appreciated by one of skill in the art in possession of the present disclosure, the "T_ID" component of the challenge reply communication in the example above provides a transaction identifier that may be utilized to identify that challenge reply communication, the "$R_a$" component of the challenge reply communication in the example above provides the response in the challenge/response operations, and the "$g^y$ mod p" component of the challenge reply communication in the example above provides a DH exponential parameter for use in the challenge/response operations to provide enhanced security where "g" and "p" are parameters of the DH group indicated by the "DHgID" component of the challenge communication and "y" is generated by the NVMe entity. Furthermore, one of skill in the art in possession of the present disclosure will appreciate that the response "$R_a$" may have been generated by the NVMe entity 710 via augmentation of the challenge "$C_a$" with $(g^x \bmod p)^y \bmod p = g^{xy} \bmod p$ to create an augmented challenge, along with the performance of the hash function identified in challenge communication on the augmented challenge, the secret associated with and stored in the NVMe entity 701 as discussed above, as well as any other response generation information (e.g., the sequence number "$I_a$" discussed above) known in the art. However, while a specific challenge reply communication (i.e., a DH-HMAC-CHAP challenge reply communication) is described, one of skill in the art in possession of the present disclosure will appreciate that challenge reply communications may include other information while remaining within the scope of the present disclosure as well.

As will be appreciated by one of skill in the art in possession of the present disclosure, in response to receiving the challenge reply communication as part of the challenge reply operations 712, the authentication verification entity 208/300 may verify the response "$R_a$" included in the challenge reply communication by augmenting the challenge "$C_a$" with $(g^y \bmod p)^x \bmod p = g^{xy} \bmod p$ to create an augmented challenge, along with performing the hash function identified in challenge communication on the augmented challenge, the secret associated with the NVMe entity 701 and stored in the authentication verification entity 208/500 as discussed above, as well as any other response generation information (e.g., the sequence number "$I_a$" discussed above) known in the art. One of skill in the art in possession of the present disclosure will recognize that the result of the performance of that hash function by the authentication verification entity 208/300 may be compared to the response "$R_a$" included in the challenge reply communication to determine whether there is a match (e.g., the "challenge result" discussed below), with a match verifying the authenticity of the NVMe entity 701, and no match indicating that the NVMe entity is not authentic.

With reference to FIG. 7A, at block 606 and in response to receiving the challenge reply communication as part of the challenge reply operations 712, the authentication verification entity 208/500 may perform authentication result operations 714 that include transmitting a challenge result communication to the NVMe entity 710. In a specific example, the authentication result communication transmitted by the authentication verification entity 208/500 may include the following information:

($T\_ID$, AuthStatus)

As will be appreciated by one of skill in the art in possession of the present disclosure, the "T_ID" component of the challenge communication in the example above provides a transaction identifier that may be utilized to identify that challenge result communication, and the "AuthStatus" component of the challenge communication in the example above provides an authentication status of the authentication performed during the challenge/response operations (e.g., identifying whether the NVMe entity is authentic or not). However, while a specific challenge result communication (i.e., a DH-HMAC-CHAP challenge result communication) is described, one of skill in the art in possession of the present disclosure will appreciate that challenge result communications may include other information while remaining within the scope of the present disclosure as well.

Thus, following block 606, the NVMe entity 701 may be authenticated by the authentication verification entity 208/500 to, for example, confirm that the NVMe entity 701 has permission/rights to access the authentication verification entity 208/500. However, while the method 600 is illustrated and described as performed by NVMe entities that have permission/rights to access the authentication verification entity 208/500, one of skill in the art in possession of the present disclosure will recognize that NVMe entities that do not have permission/rights to access the authentication verification entity 208/500 will be prevented from utilizing the authentication verification services provided by the authentication verification entity 208/500 discussed below. Thus, any of the NVMe subsystems 202a-202c/300 and/or the NVMe host device 206/400 that are authenticated at block 606 may proceed with the remainder of the method 600 as discussed below, while those that are not authenticated at block 606 will be barred from proceeding with the remainder of the method 600.

Furthermore, while specific challenge/response operations (e.g., DH-HMAC-CHAP operations) are described above, one of skill in the art in possession of the present disclosure will recognize that, because the authentication transaction is performed in the secure communication channel established at block 604 (e.g., a DTLS secure communication channel), the DH portion of the DH-HMAC-CHAP operations could be omitted from block 606 while remaining within the scope of the present disclosure as well. As discussed above and as will be appreciated by one of skill in the art in possession of the present disclosure, the NVMe entity/AVE authentication operations 700 discussed above only require the NVMe entities in the NVMe-oF authentication system be configured with linear amounts of information (e.g., providing only one secret per NVMe entity, with each NVMe secret also stored on the authentication verification entity 208/500).

The method 600 then proceeds to block 608 where an NVMe subsystem transmits a first challenge to an NVMe host device (e.g., the mutual authentication embodiments described herein may skip block 606). In an embodiment, at block 608, the controller engine 304a in the NVMe subsystem 202a/300 may transmit a challenge to the NVMe host device 206/400. In the specific examples provided below, the NVMe subsystem 202a/300 is illustrated and described as performing NVMe-oF authentication operations with the NVMe host device 206/400, but one of skill in the art in possession of the present disclosure will appreciate that the NVMe host device 206/400 may perform NVMe-oF authentication operations with any of the NVMe subsystems in the networked system 200, and any two NVMe entities in the networked system 200 may perform NVMe-oF authentication operations in a similar manner as well.

Figure 8:
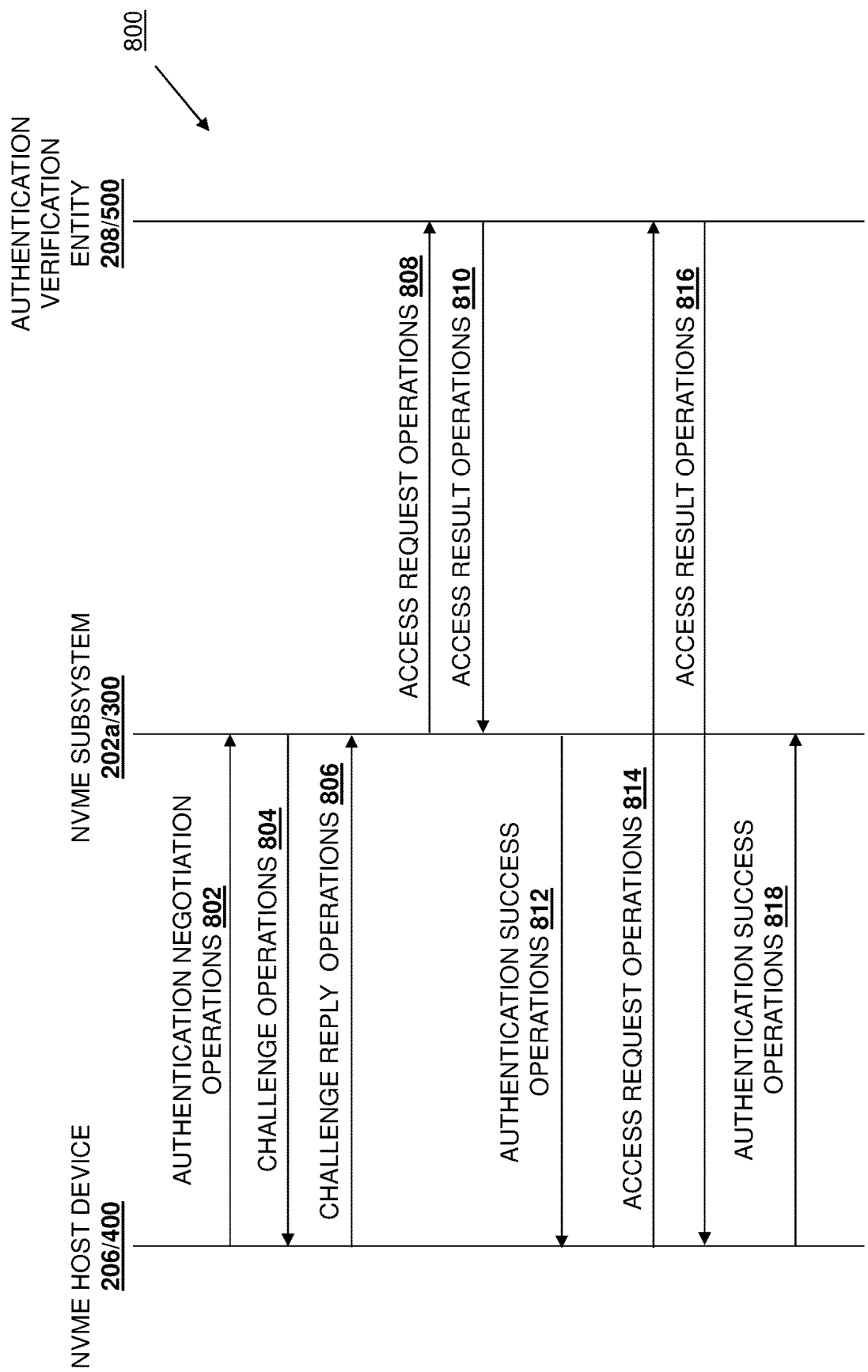
FIG. 8 is a ladder diagram illustrating an embodiment of the NVMe subsystem of FIG. 3, the NVMe host device of FIG. 4, and the authentication verification entity of FIG. 5 operating during the method of FIG. 6.

FIG. 8 provides a ladder diagram that illustrates authentication verification operations 800 performed by the AVE 208/500, the NVMe subsystem 202a/300, and the NVMe host device 206 in the examples provided herein. With reference to FIG. 8, during or prior to block 608, the host engine 404 in the NVMe host device 206/400 may perform authentication negotiation operations 802 that include transmitting an authentication negotiation communication to the NVMe subsystem 202a/300. In a specific example, the authentication negotiation communication transmitted by the NVMe host device 206/400 may include the following information:

(T_ID, AuthID, TLS_c, HashIDList, DHgIDList)

As will be appreciated by one of skill in the art in possession of the present disclosure, the "T_ID" component of the authentication negotiation communication in the example above provides a transaction identifier that may be utilized to identify that authentication negotiation communication, the "AuthID" component of the authentication negotiation communication in the example above provides an authentication protocol identifier that may be utilized to identify an authentication protocol for use in the challenge/response operations, the "TLS_c" component of the authentication negotiation communication in the example above provides a secure channel creation identifier that may be utilized to identify that a secure channel should be established in response to successful challenge/response operations, the "HashIDList" component of the authentication negotiation communication in the example above provides a list of secure hash functions that may be utilized in the challenge/response operations, and the "DHgIDList" component of the authentication negotiation communication in the example above provides a list of DH groups that may be utilized in the challenge/response operations to provide enhanced security. However, while a specific authentication negotiation communication (i.e., a DH-HMAC-CHAP authentication negotiation communication) is described, one of skill in the art in possession of the present disclosure will appreciate that authentication negotiation communications may include other information while remaining within the scope of the present disclosure as well.

With reference to FIG. 8, at block 608 and in response to receiving the authentication negotiation communication as part of the authentication negotiation operations 802, the controller engine 304a in the NVMe subsystem 202a/300 may perform challenge operations 804 that include transmitting a challenge communication to the NVMe host device 206/400. In a specific example, the controller engine 304a in the NVMe subsystem 202a/300 may select parameters for the protocols (e.g., select a HashID from a HashIDList and a DHgID from a DHgIDList in the examples provided herein), and then generate and transmit a challenge communication, and one of skill in the art in possession of the present disclosure will appreciate that the negotiation may fail if the controller engine 304a in the NVMe subsystem 202a/300 does not find any of the available/offered IDs acceptable. Thus, in some examples, the challenge communication transmitted by the controller engine 304a in the NVMe subsystem 202a/300 may include the following information:

(T_ID, HashID, DHgID, $I_1$, $C_1$, $g^x$ mod p)

As will be appreciated by one of skill in the art in possession of the present disclosure, the "T_ID" component of the challenge communication in the example above provides a transaction identifier that may be utilized to identify that challenge communication, the "HashID" component of the challenge communication in the example above provides an identification of a hash function for use in the challenge/response operations, the "DHgID" component of the challenge communication in the example above provides an identification of a DH group for use in the challenge/response operations to provide enhanced security, the "$I_1$" component of the challenge communication in the example above provides a first sequence number for use in the challenge/response operations to provide enhanced security, the "$C_1$" component of the challenge communication in the example above provides the first challenge in the challenge/response operations, and the "$g^x$ mod p" component of the challenge communication in the example above provides a DH exponential parameter for use in the challenge/response operations to provide enhanced security where "g" and "p" are parameters of the DH group indicated by the "DHgID" component and "x" is generated by the controller engine. However, while a specific challenge communication (i.e., a DH-HMAC-CHAP challenge communication) is described, one of skill in the art in possession of the present disclosure will appreciate that challenge communications may include other information while remaining within the scope of the present disclosure as well.

The method 600 then proceeds to block 610 where the NVMe host device transmits a first challenge reply and a second challenge to the NVMe subsystem. With reference to FIG. 8, in an embodiment of block 610 and in response to receiving the challenge communication, host engine 404 in the NVMe host device 206/400 may perform challenge reply operations 806 that include transmitting a challenge reply communication to the NVMe subsystem 202a/300. In a specific example, the challenge reply communication transmitted by the NVMe host device 206/400 may include the following information:

(T_ID, $R_1$, $g^y$ mod p, [$I_2$, $C_2$])

As will be appreciated by one of skill in the art in possession of the present disclosure, the "T_ID" component of the challenge reply communication in the example above provides a transaction identifier that may be utilized to identify that challenge reply communication, the "$R_1$" component of the challenge reply communication in the example above provides the first response in the challenge/response operations, the "$g^y$ mod p" component of the challenge reply communication in the example above provides a DH exponential parameter for use in the challenge/response operations to provide enhanced security where "g" and "p" are parameters of the DH group indicated by the "DHgID" component of the challenge communication and "y" is generated by the NVMe host device, the "$I_2$" component of the challenge reply communication in the example above provides a second sequence number for use in the challenge/response operations to provide enhanced security, and the "$C_2$" component of the challenge communication in the example above provides the second challenge in the challenge/response operations. Furthermore, one of skill in the art in possession of the present disclosure will appreciate that the first response "$R_1$" may have been generated by the host engine 404 in the NVMe host device 206/400 via augmentation of the first challenge "$C_1$" with $(g^x \bmod p)^y \bmod p = g^{xy} \bmod p$ to create an augmented challenge, along with the performance of the hash function identified in challenge communication on the augmented challenge, the secret associated with and stored in the NVMe host device 206/400 as discussed above, as well as any other response generation information (e.g., the first sequence number "$I_1$" discussed above) known in the art. However, while a specific challenge reply communication (i.e., a DH-HMAC-CHAP challenge reply communication) is described, one of skill in the art in possession of the present disclosure will appreciate that challenge reply communications may include other information while remaining within the scope of the present disclosure as well.

In a specific example, the first response "$R_1$" included in the challenge reply communication may be generated by the host engine 404 in NVMe host device 206/400 by performing an HMAC function (as specific in IETF RFC 2104) using the hash function (H) identified in the challenge communication, the secret ("$K_h$") associated with the NVMe host device 206/400 and stored in the NVMe host device 206/400 as discussed above, a first augmented challenge ("$C_{a1}$") that is discussed in further detail below, the first sequence number ("$I_1$"), the transaction identifier ("T_ID") that one of skill in the art in possession of the present disclosure will recognize is constant across the sequence of NVMe host device/NVMe subsystem operations illustrated in FIG. 8, and the secure channel creation identifier ("TLS_c") as detailed below:

$$R_1 = \text{HMAC}(K_h, C_{a1} \| I_1 \| T\_ID \| TLS\_c)$$

One of skill in the art in possession of the present disclosure will appreciate that additional elements may be included in the list of concatenated parameters that are passed to the HMAC function in order to strengthen the security of the resulting response.

Continuing with this specific example, the first augmented challenge "$C_{a1}$" utilized to generate the first response "$R_1$" may be generated by the host engine 404 in NVMe host device 206/400 by performing the hash function (H) identified in the challenge communication using the first challenge "$C_1$", the DH exponential parameter "$g^x \bmod p$", and the DH parameter "y", as detailed below:

$$C_{a1} = H(C_1 \| g^{xy} \bmod p)$$

One of skill in the art in possession of the present disclosure will appreciate that augmentation of a challenge with $g^{xy} \bmod p$ may be computed in other manners that will fall within the scope of the present disclosure as well.

As will be appreciated by one of skill in the art in possession of the present disclosure, the host engine 404 in NVMe host device 206/400 knows "y", and thus may compute $(g^x \bmod p)^y$ when it receives $g^x \bmod p$. Furthermore, the controller engine 304a in NVMe subsystem 202a/300 knows "x", and thus may perform the $(g^y \bmod p)^x \bmod p$ calculation to compute $g^{xy} \bmod p$ when $g^y \bmod p$ is received from the NVMe host device 206/400 as $g^{xy} \bmod p = g^{yx} \bmod p$.

The method 600 then proceeds to block 612 where the NVMe subsystem transmits a first authentication verification request to the authentication verification entity. In an embodiment, at block 612 and in response to receiving the challenge reply communication, the controller engine 304a in the NVMe subsystem 202a/300 may perform access request operations 808 that include transmitting an access request communication to the authentication verification entity 208/500. In an embodiment, the access request communication transmitted to the authentication verification entity may contain all the parameters needed by the authentication verification entity in order to perform the verification of the corresponding authentication transaction. In a specific example, the access request communication transmitted by the controller engine 304a in the NVMe subsystem 202a/300 may include the following information:

(ID, $NQN_1$, T_ID, AuthID, TLS_c, HashID, DHgID, $I_1$, $C_{a1}$, $R_1$)

As will be appreciated by one of skill in the art in possession of the present disclosure, the "ID" component of the access request communication in the example above provides an access request/result identifier that connects the access requests received by the authentication verification entity 208/500 with the access results provided by the authentication verification entity 208/500, the "$NQN_1$" component of the access request communication in the example above provides an identifier for the NVMe host device 206/400 (e.g., via an NQN associated with the NVMe host device 206/400), the "T_ID" component of the access request communication in the example above provides a transaction identifier that may be utilized to identify the authentication transaction that access request communication refers to, the "AuthID" component of the access request communication in the example above provides an authentication protocol identifier that may be utilized to identify an authentication protocol for use in the authentication verification operations, the "TLS_c" component of the access request communication in the example above provides a secure channel creation identifier that may be utilized to identify that a secure channel should be established in response to successful authentication verification operations, the "HashID" component of the access request communication in the example above provides an identification of a hash function for use in the authentication verification operations, the "DHgID" component of the access request communication in the example above provides an identification of a DH group for use in the authentication verification operations to provide enhanced security, the "$I_1$" component of the access request communication in the example above provides a first sequence number for use in the authentication verification operations to provide enhanced security, the "$C_{a1}$" component of the access request communication in the example above provides the first augmented challenge in the authentication verification operations, and the "$R_1$" component of the access request communication in the example above provides the first response in the challenge/response operations. However, while a specific access request communication (i.e., a DH-HMAC-CHAP access request communication) is described, one of skill in the art in possession of the present disclosure will appreciate that access request communications may include other information while remaining within the scope of the present disclosure as well.

As will be appreciated by one of skill in the art in possession of the present disclosure, the "DHgID" component of the access request communication in the example above may not be required for the authentication verification operations discussed below, as the computation of the first augmented challenge "$C_{a1}$" causes the verification computation to not depend on the DH exchange, but is provided in the access request communication in the example above for completeness, as it may be provided in an authentication verification entity log to record which DH group was used in each authentication verification computation.

The method 600 then proceeds to block 614 where the authentication verification entity verifies a first response in the first challenge reply and transmits a first authentication verification response to the NVMe subsystem. In an embodiment, at block 614 and in response to receiving the access request communication as part of the access request operations 808, the authentication verification engine 504 in the authentication verification entity 208/500 may perform authentication verification operations that include verifying the first response "$R_1$" included in the access request communication by performing the HMAC function using the hash function (H) identified in the access request communication, the secret ("$K_h$") associated with the NVMe host device 206/400 and stored in the authentication verification entity 208/500 as discussed above, the first augmented challenge "$C_{a1}$", the first sequence number "$I_1$", the transaction identifier "T_ID" that one of skill in the art in possession of the present disclosure will recognize is constant across the sequence of NVMe host device/NVMe subsystem operations illustrated in FIG. 8, the secure channel creation identifier "TLS_c", and any other parameter relevant to the security computation that was provided in the access request message, as detailed below:

$$R_1 = \text{HMAC}(K_h, C_{a1} \| I_1 \| T\_ID \| TLS\_c)$$

One of skill in the art in possession of the present disclosure will recognize that the result of the performance of that HMAC function by the authentication verification entity 208/300 may be compared to the first response "$R_1$" included in the access request communication to determine whether there is a match (e.g., the "AuthStatus" discussed below), with a match verifying the authenticity of the NVMe host device 206/400, and no match indicating that the NVMe host device 206/400 is not authentic.

With reference to FIG. 8, in an embodiment of block 614 and in response to authenticating the NVMe host device 206/400, the authentication verification engine 504 in the authentication verification entity 208/500 may perform access result operations 810 that include transmitting an access result communication to the NVMe subsystem 202a/300. In a specific example, the access result communication transmitted by the authentication verification entity 208/500 may include the following information:
(ID, AuthStatus)

As will be appreciated by one of skill in the art in possession of the present disclosure, the "ID" component of the access result communication in the example above provides an access request/result identifier that connects the access result provided by the authentication verification entity 208/500 with the access request transmitted by the NVMe subsystem 202a/300, while the "AuthStatus" component provides an authentication status of the authentication operations (e.g., identifying whether the NVMe host is authentic or not). However, while a specific access result communication (i.e., a DH-HMAC-CHAP access result communication) is described, one of skill in the art in possession of the present disclosure will appreciate that access result communications may include other information while remaining within the scope of the present disclosure as well.

In the event of an authentication success (i.e., AuthStatus indicates that the NVMe host is authentic), the method 600 then proceeds to block 616 where the NVMe subsystem transmits a first authentication success communication and a second challenge reply to the NVMe host device, and one of skill in the art in possession of the present disclosure will appreciate how block 616 may not be performed in the event of an authentication failure. With reference to FIG. 8, in an embodiment of block 616 and in response to receiving the access success communication, the controller engine 304a in the NVMe subsystem 202a/300 may perform authentication success operations 812 that include transmitting an authentication success communication to the NVMe host device 206/400. In a specific example, the authentication success communication transmitted by the controller engine 304a in the NVMe subsystem 202a/300 may include the following information:
(T_ID, [$R_2$])

As will be appreciated by one of skill in the art in possession of the present disclosure, the "T_ID" component of the authentication success communication in the example above provides a transaction identifier that may be utilized to identify that authentication success communication, and the "$R_2$" component of the authentication success communication in the example above provides the second response in the challenge/response operations. However, while a specific authentication success communication (i.e., a DH-HMAC-CHAP authentication success communication) is described, one of skill in the art in possession of the present disclosure will appreciate that authentication success communications may include other information while remaining within the scope of the present disclosure as well. Furthermore, one of skill in the art in possession of the present disclosure will appreciate that the bi-directional authentication illustrated in FIG. 8 may be replaced by uni-directional authentication (e.g., the authentication verification entity 208/500 may only perform the operations 808 and 810 to authenticate the NVMe host device 206/400, while not performing the operations 814 and 816 to authenticate the NVMe subsystem 202a/300), in which case the operations 814, 816, and 818 may be omitted.

In a specific example, the second response "$R_2$" included in the authentication success communication may be generated by the controller engine 304a in the NVMe subsystem 302 in NVMe subsystem 202a/300 by performing an HMAC function using the hash function (H) identified in the challenge communication, the secret ("$K_c$") associated with the NVMe subsystem 302 and stored in the NVMe subsystem 302 as discussed above, a second augmented challenge ("$C_{a2}$") that is discussed in further detail below, the second sequence number ("$I_2$"), the transaction identifier ("T_ID") that one of skill in the art in possession of the present disclosure will recognize is constant across the sequence of NVMe host device/NVMe subsystem operations illustrated in FIG. 8, the secure channel creation identifier ("TLS_c"), and any other parameter relevant to the security computation that was provided in the access request message, as detailed below:

$$R_2 = \text{HMAC}(K_c, C_{a2} \| I_2 \| T\_ID \| TLS\_c)$$

One of skill in the art in possession of the present disclosure will appreciate that additional elements may be included in the list of concatenated parameters passed to the HMAC function in order to strengthen the security of the resulting response.

Continuing with this specific example, the second augmented challenge "$C_{a2}$" utilized to generate the second response "$R_2$" may be generated by the controller engine 304a in the NVMe subsystem 302 in NVMe subsystem 202a/300 by performing the hash function (H) identified in the challenge communication using the second challenge "$C_2$" and the DH exponential parameter "$g^y$ mod p" and the DH parameter "y", as detailed below:

$$C_{a2}=H(C_2\|g^{xy} \bmod p)$$

One of skill in the art in possession of the present disclosure will appreciate that augmentation of a challenge with $g^{xy}$ mod p may be computed in other manners that will fall within the scope of the present disclosure as well.

Similarly as discussed above, the host engine 404 in NVMe host device 206/400 knows "y", and thus may compute $(g^x \bmod p)^y$ when it receives $g^x$ mod p. Furthermore, the controller engine 304a in NVMe subsystem 202a/300 knows "x", and thus may perform the $(g^y \bmod p)^x$ mod p calculation to compute $g^{xy}$ mod p when $g^y$ mod p is received from the NVMe host device 206/400 as $g^{xy}$ mod $p=g^{yx}$ mod p.

The method 600 then proceeds to block 618 where the NVMe host device transmits a second authentication verification request to the authentication verification entity. In an embodiment, at block 618 and in response to receiving the access success communication, the host engine 404a in the NVMe host device 206/400 may perform access request operations 814 that include transmitting an access request communication to the authentication verification entity 208/500. In a specific example, the access request communication transmitted by the host engine 404a in the NVMe host device 206/400 may include the following information:
(ID, $NQN_2$, T_ID, AuthID, TLS_c, HashID, DHgID, $I_2$, $C_{a2}$, $R_2$)

As will be appreciated by one of skill in the art in possession of the present disclosure, the "ID" component of the access request communication in the example above provides an access request/result identifier that connects the access requests received by the authentication verification entity 208/500 with the access results provided by the authentication verification entity 208/500, the "$NQN_2$" component of the access request communication in the example above provides an identifier for the NVMe subsystem 202a/300, the "T_ID" component of the access request communication in the example above provides a transaction identifier that may be utilized to identify the authentication transaction that access request communication refers to, the "AuthID" component of the access request communication in the example above provides an authentication protocol identifier that may be utilized to identify an authentication protocol for use in the authentication verification operations, the "TLS_c" component of the access request communication in the example above provides a secure channel creation identifier that may be utilized to identify that a secure channel should be established in response to successful authentication verification operations, the "HashID" component of the access request communication in the example above provides an identification of a hash function for use in the authentication verification operations, the "DHgID" component of the access request communication in the example above provides an identification of a DH group for use in the authentication verification operations to provide enhanced security, the "$I_2$" component of the access request communication in the example above provides a second sequence number for use in the authentication verification operations to provide enhanced security, the "$C_{a2}$" component of the access request communication in the example above provides the second augmented challenge in the authentication verification operations, and the "$R_2$" component of the access request communication in the example above provides the second response in the challenge/response operations. However, while a specific access request communication (i.e., a DH-HMAC-CHAP access request communication) is described, one of skill in the art in possession of the present disclosure will appreciate that access request communications may include other information while remaining within the scope of the present disclosure as well.

Similarly as discussed above, the "DHgID" component of the access request communication in the example above may not be required for the authentication verification operations discussed below, as the computation of the second augmented challenge "$C_{a2}$" causes the verification computation to not depend on the DH exchange, but is provided in the access request communication in the example above for completeness, as it may be included in an authentication verification entity log to record which DH group was used in each authentication verification computation.

The method 600 then proceeds to block 620 where the authentication verification entity verifies a second response in the second challenge reply and transmits a second authentication verification response to the NVMe host device. In an embodiment, at block 620 and in response to receiving the access request communication as part of the access request operations 814, the authentication verification engine 504 in the authentication verification entity 208/500 may perform authentication verification operations that include verifying the second response ("$R_2$") included in the access request communication by performing the HMAC function using the hash function (H) identified in the access request communication, the secret ("$K_c$") associated with the NVMe subsystem 202a/300 and stored in the authentication verification entity 208/500 as discussed above, the second augmented challenge ("$C_{a2}$"), the second sequence number ("$I_2$"), the transaction identifier ("T_ID") that one of skill in the art in possession of the present disclosure will recognize is constant across the sequence of NVMe host device/NVMe subsystem operations illustrated in FIG. 8, and the secure channel creation identifier ("TLS_c"), as detailed below:

$$R_2=\text{HMAC}(K_c, C_{a2}\|I_2\|T\_ID\|TLS\_c)$$

One of skill in the art in possession of the present disclosure will recognize that the result of the performance of that HMAC function by the authentication verification entity 208/300 may be compared to the second response "$R_2$" included in the access request communication to determine whether there is a match (e.g., the "access result" discussed below), with a match verifying the authenticity of the NVMe subsystem 202a/300, and no match indicating that the NVMe subsystem 202a/300 is not authentic.

With reference to FIG. 8, in an embodiment of block 620 and in response to authenticating the NVMe subsystem 202a/300, the authentication verification engine 504 in the authentication verification entity 208/500 may perform access result operations 816 that include transmitting an access result communication to the NVMe host device 206/400. In a specific example, the access result communication transmitted by the authentication verification entity 208/500 may include the following information:
(ID, AuthStatus)

As will be appreciated by one of skill in the art in possession of the present disclosure, the "ID" component of the access result communication in the example above provides an access request/result identifier that connects the access result provided by the authentication verification entity 208/500 with the access request transmitted by the NVMe host device 206/400, while the "AuthStatus" component provides an authentication status of the authentication operations (e.g., identifying whether the NVMe subsystem is authentic or not). However, while a specific access result communication (i.e., a DH-HMAC-CHAP access result communication) is described, one of skill in the art in possession of the present disclosure will appreciate that access result communications may include other information while remaining within the scope of the present disclosure as well.

In the event of an authentication success (i.e., AuthStatus indicates that the NVMe subsystem is authentic), the method 600 then proceeds to block 622 where the NVMe host device transmits a second authentication success communication to the NVMe subsystem, and one of skill in the art in possession of the present disclosure will appreciate how block 622 may not be performed in the event of an authentication failure. With reference to FIG. 8, in an embodiment of block 622 and in response to receiving the access result communication, the host engine 404 in the NVMe host device 206/400 may perform authentication success operations 818 that include transmitting an authentication success communication to the NVMe subsystem 202a/300. In a specific example, the authentication success communication transmitted by the host engine 404 in the NVMe host device 2024/400 may include the following information:
(T_ID)

As will be appreciated by one of skill in the art in possession of the present disclosure, the "T_ID" component of the authentication success communication in the example above provides a transaction identifier that may be utilized to identify that authentication success communication. However, while a specific authentication success communication (i.e., a DH-HMAC-CHAP authentication success communication) is described, one of skill in the art in possession of the present disclosure will appreciate that authentication success communications may include other information while remaining within the scope of the present disclosure as well.

As will be appreciated by one of skill in the art in possession of the present disclosure, in some embodiments the authentication of the NVMe host device 206/400 and the NVMe subsystem 202a/300 discussed above may complete the security operations that allow the NVMe host device 206/400 and the NVMe subsystem 202a/300 to securely interact (e.g., the NVMe subsystem 202a/300 may allow the NVMe host device 206/400 to perform storage operations that result in the storage and/or retrieval of data with the NVM subsystem 202a/300). However, in other embodiments the authentication of the NVMe host device 206/400 and the NVMe subsystem 202a/300 discussed above may be utilized as a foundation for a broader security architecture.

Figure 9:
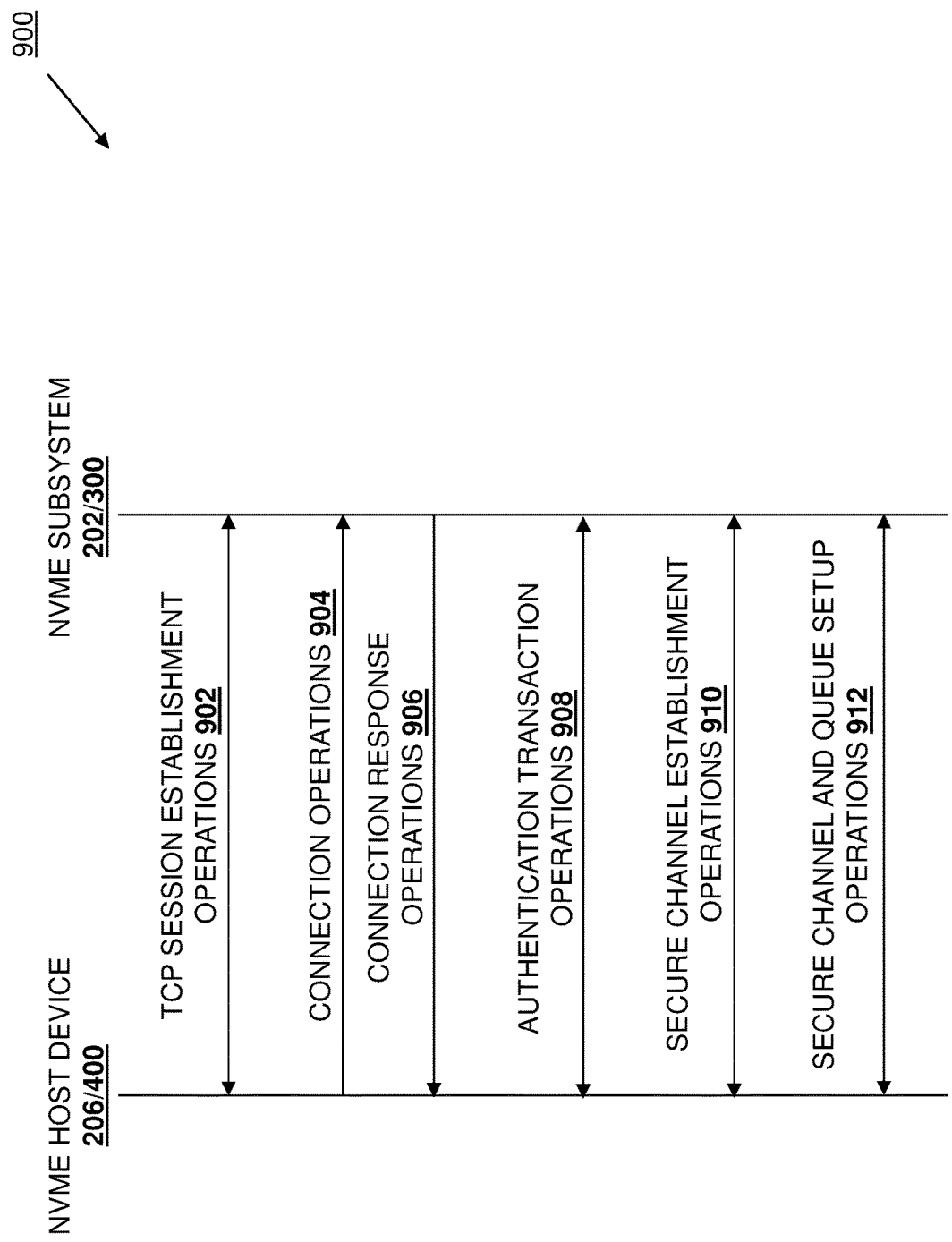
FIG. 9 is a ladder diagram illustrating an embodiment of the NVMe subsystem of FIG. 3 and the NVMe host device of FIG. 4 operating prior to, during, and subsequent to the method of FIG. 6.

For example, with reference to FIG. 9, a ladder diagram is illustrated that details security operations 900 that may be performed by the NVMe subsystem 202a/300 and the NVMe host device 206/400 in the examples provided herein, and one of skill in the art in possession of the present disclosure will appreciate the illustrated operations provide for the authentication of the NVMe host device 205/400202a/300 and (in bidirectional authentication embodiments) the NVMe subsystem 202a/300 that intend to communicate (which must be successfully completed in order to continue secure channel establishment operations), the generation of key material that is shared only between the NVMe subsystem 202a/300 and the NVMe host device 206/400, and the establishment of a secure channel between the NVMe subsystem 202a/300 and the NVMe host device 206/400 in order to provide integrity and confidentiality for the data traffic transmitted thereon. In a specific example, the key material may be provided by a Transport Layer Security Pre-Shared Key (TLS PSK) that may be generated via the following equation:

$$TLS\ PSK = HMAC(K_s, C_1 \| C_2)$$

where:
$K_S = H((g^x \bmod p)^y \bmod p) = H((g^y \bmod p)^x \bmod p) = H(g^{xy} \bmod p)$ One of skill in the art in possession of the present disclosure will appreciate that a TLS PSK based on $g^{xy}$ mod p may be computed in other manners that will fall within the scope of the present disclosure as well.

For example, FIG. 9 illustrates how the NVMe subsystem 202a/300 and the NVMe host device 206/400 may perform Transmission Control Protocol (TCP) session establishment operations 902 in order to establish a TCP session between the NVMe subsystem 202a/300 and the NVMe host device 206/400. The NVMe host device 206/400 may then perform connection operations 904 and the NVMe subsystem 202a/300 may perform connection response operations 906 in order to set up NVMe queues, associate the NVMe host device 206/400 with the NVMe subsystem 202a/300, and/or provide other connection results that would be apparent to one of skill in the art in possession of the present disclosure. The NVMe subsystem 202a/300 and the NVMe host device 206/400 may then perform authentication transaction operations 908 to generate a key that is shared between the NVMe subsystem 202a/300 and the NVMe host device 206/400. The NVMe subsystem 202a/300 and the NVMe host device 206/400 may then perform secure channel establishment operations 910 that may include utilizing the key (e.g., the TLS PSK in the example above) shared during the authentication transaction operations 908 in order to perform a Transaction Layer Security (TLS) negotiation and establish a secure communication channel. The NVMe subsystem 202a/300 and the NVMe host device 206/400 may then perform secure channel and queue setup operations 912 to configure the secure communication channel and associated queues so that the NVMe subsystem 202a/300 and the NVMe host device 206/400 are fully configured to securely interact with each other.

Thus, systems and methods have been described that provide a centralized authentication verification entity that operates to offload authentication verification operations from NVMe entities in the NVMe-oF system, which allows the NVMe entities to be provisioned with only their associated secret utilized in authentication operations, thus providing a scalable NVMe-oF authentication system. For example, the NVMe-oF authentication system of the present disclosure may include an authentication verification entity coupled to an NVMe subsystem and an NVMe host device, with the NVMe subsystem is coupled to the NVMe host device. The NVMe subsystem transmits a first challenge to the NVMe host device and, in response, receives a first challenge reply from the NVME host device. The NVMe subsystem then generates a first authentication verification request communication that includes a first response that was provided in the first challenge reply by the NVMe host device using a first instance of a first secret that is stored in the NVMe host device, and transmits the first authentication verification request communication to the authentication verification entity. The authentication verification entity receives the first authentication verification request communication, verifies the first response using a second instance of the first secret that is stored in the authentication verification entity and, in response, transmits a first authentication verification response communication to the NVMe subsystem. As such, the NVMe-oF authentication system is linearly configurable (i.e., via the one secret assigned per NVMe entity discussed above), while allowing any two NVMe entities to them utilize a subsequent authentication protocol to generate key material between themselves (e.g., effectively generating an on-the-fly pre-shared key between the two) that may then be utilized to set up a secure communication channel between those NVMe entites.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Non-Volatile Memory express (NVMe) over Fabrics (NVMe-oF) authentication system, comprising:
   an authentication verification entity;
   a Non-Volatile Memory express (NVMe) host device;
   an NVMe subsystem that is coupled to the authentication verification entity and the NVMe host device, wherein the NVMe subsystem is configured to:
   authenticate the authentication verification entity,
   wherein the authentication verification entity is configured, subsequent to being authenticated by the NVMe subsystem, to:
     transmit a first challenge to the NVMe subsystem;
     receive, in response to the first challenge, a first challenge reply from the NVME subsystem that includes a first response that was provided in the first challenge reply by the NVMe subsystem using a first instance of a first secret that is stored in the NVMe subsystem;
     verify the first response using a second instance of the first secret that is stored in the authentication verification entity; and
     authenticate, in response to verifying the first response, the NVMe subsystem,
   wherein the NVMe subsystem is configured, subsequent to being authenticated by the authentication verification entity, to:
     transmit a second challenge to the NVMe host device;
     receive, in response to the second challenge, a second challenge reply from the NVME host device;
     generate a first authentication verification request communication that includes a second response that was provided in the second challenge reply by the NVMe host device using a first instance of a second secret that is stored in the NVMe host device; and
     transmit, to the authentication verification entity, the first authentication verification request communication, and
   wherein the authentication verification entity is configured to:
     receive the first authentication verification request communication from the NVMe subsystem;
     verify the second response using a second instance of the second secret that is stored in the authentication verification entity; and
     transmit, in response to verifying the second response, a first authentication verification response communication to the NVMe subsystem.

2. The system of claim 1, wherein the NVMe host device is configured to:
   transmit a third challenge to the NVMe subsystem;
   receive, in response to the third challenge, a third challenge reply from the NVME subsystem;
   generate a second authentication verification request communication that includes a third response that was provided in the third challenge reply by the NVMe subsystem using a first instance of a third secret that is stored in the NVMe subsystem; and
   transmit the second authentication verification request communication, and
   wherein the authentication verification entity is coupled to the NVMe host device and is configured to:
     receive the second authentication verification request communication from the NVMe host device;
     verify the third response using a second instance of the third secret that is stored in the authentication verification entity; and
     transmit, in response to verifying the third response, a second authentication verification response communication to the NVMe host device.

3. The system of claim 1, wherein the NVMe subsystem is configured to:
   receive the first authentication verification response communication from the authentication verification entity; and
   enable, in response to receiving the first authentication verification response communication, storage operations by the NVMe host device via a communication channel with the NVMe host device.

4. The system of claim 1, wherein the NVMe subsystem is configured to authenticate the authentication verification entity by:
   authenticating, using an authentication verification entity identifier and an authentication verification entity public key, the authentication verification entity.

5. The system of claim 1, wherein the authentication verification entity is configured, in response to being authenticated by the NVMe subsystem, to:
   establish a secure communication channel with the NVMe subsystem.

6. The system of claim 1, wherein the NVMe subsystem is configured to authenticate the authentication verification entity by:
   performing mutual authentication operations, using an authentication verification entity/NVMe subsystem shared secret, with the authentication verification entity.

7. The system of claim 1, wherein the NVMe host device is configured to:
   authenticate the authentication verification entity,
   wherein the authentication verification entity is configured, subsequent to being authenticated by the NVMe host device, to:
     transmit a third challenge to the NVMe host device;
     receive, in response to the third challenge, a third challenge reply from the NVME host device that includes a third response that was provided in the third challenge reply by the NVMe host device using a first instance of a third secret that is stored in the NVMe host device;
     verify the third response using a second instance of the third secret that is stored in the authentication verification entity; and
     authenticate, in response to verifying the third response, the NVMe host device.

8. The system of claim 7, wherein the NVMe host device is configured to authenticate the authentication verification entity by:

authenticating, using the authentication verification entity identifier and the authentication verification entity public key, the authentication verification entity.

9. The system of claim 7, wherein the NVMe host device is configured to authenticate the authentication verification entity by:
performing mutual authentication operations, using an authentication verification entity/NVMe host device shared secret, with the authentication verification entity.

10. An Information Handling System (IHS), comprising:
a processing system; and
a memory system that is coupled to the processing system and that includes instructions that, when executed by the processing system, cause the processing system to provide an authentication verification engine that is configured, subsequent to being authenticated by a Non-Volatile Memory express (NVMe) subsystem, to:
transmit a first challenge to the NVMe subsystem;
receive, in response to the first challenge, a first challenge reply from the NVME subsystem that includes a first response that was provided in the first challenge reply by the NVMe subsystem using a first instance of a first secret that is stored in the NVMe subsystem;
verify the first response using a second instance of the first secret that is stored in the IHS; and
authenticate, in response to verifying the first response, the NVMe subsystem,
wherein the authentication verification entity is configured, subsequent to authenticating the NVMe subsystem, to:
receive, from the NVMe subsystem, a first authentication verification request communication that includes a second response that was provided to the NVMe subsystem in a second challenge reply by an NVMe host device using a first instance of a second secret that is stored in the NVMe host device;
verify the second response using a second instance of the second secret that is stored in the IHS; and
transmit, in response to verifying the second response, a first authentication verification response communication to the NVMe subsystem.

11. The IHS of claim 10, wherein the authentication verification engine is configured to:
receive, from the NVMe host device, a second authentication verification request communication that includes a third response that was provided to the NVMe host device in a third challenge reply by the NVMe subsystem using a first instance of a third secret that is stored in the NVMe subsystem;
verify the third response using a second instance of the third secret that is stored in the IHS; and
transmit, in response to verifying the third response, a second authentication verification response communication to the NVMe host device.

12. The IHS of claim 10, wherein the authentication verification engine is configured to be authenticated by the NVMe subsystem by:
authenticating, using an authentication verification entity identifier and an authentication verification entity public key, with the NVMe subsystem.

13. The IHS of claim 10, wherein the authentication verification engine is configured to be authenticated by the NVMe subsystem by:
performing, using an authentication verification entity/ NVMe subsystem shared secret, mutual authentication operations with the NVMe subsystem.

14. The IHS of claim 10, wherein the authentication verification engine is configured to:
establish, in response to being authenticated by the NVMe subsystem, a secure communication channel with the NVMe subsystem.

15. A method for performing Non-Volatile Memory express (NVMe) over Fabrics authentication, comprising:
transmitting, by the authentication verification entity in response to being authenticated by a Non-Volatile Memory express (NVMe) subsystem, a first challenge to the NVMe subsystem;
receiving, by the authentication verification entity in response to the first challenge, a first challenge reply from the NVME subsystem that includes a first response that was provided in the first challenge reply by the NVMe subsystem using a first instance of a first secret that is stored in the NVMe subsystem;
verifying, by the authentication verification entity, the first response using a second instance of the first secret that is stored in the authentication verification entity;
authenticating, by the authentication verification entity in response to verifying the first response, the NVMe subsystem;
receiving, by the authentication verification entity from the NVMe subsystem subsequent to authenticating the NVMe subsystem, a first authentication verification request communication that includes a second response that was provided to the NVMe subsystem in a second challenge reply by an NVMe host device using a first instance of a second secret that is stored in the NVMe host device;
verifying, by the authentication verification entity, the second response using a second instance of the second secret that is stored in the authentication verification entity; and
transmitting, by the authentication verification entity in response to verifying the second response, a first authentication verification response communication to the NVMe subsystem.

16. The method of claim 15, further comprising:
receiving, by the authentication verification entity from the NVMe host device, a third authentication verification request communication that includes a third response that was provided to the NVMe host device in a third challenge reply by the NVMe subsystem using a first instance of a third secret that is stored in the NVMe subsystem;
verifying, by the authentication verification entity, the third response using a second instance of the third secret that is stored in the authentication verification entity; and
transmitting, by the authentication verification entity in response to verifying the third response, a second authentication verification response communication to the NVMe host device.

17. The method of claim 16, wherein the first authentication verification response communication and the second authentication verification response communication indicate to the NVMe subsystem and the NVMe host device to continue communications.

18. The method of claim 15, further comprising:
authenticating, by the NVME subsystem using an authentication verification entity identifier and an authentication verification entity public key, the authentication verification entity.

19. The method of claim 15, further comprising:
establishing, by the authentication verification entity with the NVMe subsystem in response to being authenticated by the NVMe subsystem, a secure communications channel.

20. The method of claim 15, further comprising:
authenticating, by the NVMe subsystem using an authentication verification entity/NVMe subsystem shared secret, the authentication verification entity by performing mutual authentication operations with the authentication verification entity.

* * * * *